United States Patent
Waibel

(10) Patent No.: US 12,401,854 B2
(45) Date of Patent: Aug. 26, 2025

(54) NOTIFICATION OF MANIPULATIONS IN COMMUNICATION SESSIONS

(71) Applicant: Zoom Communications, Inc., San Jose, CA (US)

(72) Inventor: Alexander Waibel, Sammamish, WA (US)

(73) Assignee: Zoom Communications, Inc., San Jose, CA (US)

( * ) Notice: Subject to any disclaimer, the term of this patent is extended or adjusted under 35 U.S.C. 154(b) by 0 days.

(21) Appl. No.: 18/161,358

(22) Filed: Jan. 30, 2023

(65) Prior Publication Data

US 2024/0259636 A1    Aug. 1, 2024

(51) Int. Cl.
*H04N 21/472* (2011.01)
*H04N 21/4788* (2011.01)

(52) U.S. Cl.
CPC ... *H04N 21/47205* (2013.01); *H04N 21/4788* (2013.01)

(58) Field of Classification Search
None
See application file for complete search history.

(56) References Cited

U.S. PATENT DOCUMENTS

| | | | |
|---|---|---|---|
| 10,019,561 B1 | 7/2018 | Shelton et al. | |
| 11,594,032 B1 * | 2/2023 | Raman | H04N 21/8352 |
| 2001/0056468 A1 * | 12/2001 | Okayasu | H04N 7/15 |
| | | | 713/168 |
| 2008/0118042 A1 | 5/2008 | Hogg | |
| 2010/0228656 A1 | 9/2010 | Wasserblat et al. | |
| 2010/0305960 A1 | 12/2010 | Gutierrez et al. | |
| 2012/0262296 A1 | 10/2012 | Bezar | |
| 2013/0162752 A1 | 6/2013 | Herz et al. | |
| 2013/0216029 A1 | 8/2013 | Pawlewski | |
| 2014/0330563 A1 | 11/2014 | Faians et al. | |
| 2018/0342121 A1 | 11/2018 | Borgmeyer | |
| 2021/0037128 A1 | 2/2021 | Breuer et al. | |
| 2021/0193174 A1 | 6/2021 | Enzinger et al. | |
| 2021/0209388 A1 | 7/2021 | Ciftci et al. | |
| 2021/0358503 A1 | 11/2021 | Keret et al. | |
| 2022/0021724 A1 * | 1/2022 | Sivakumar | H04L 65/1083 |
| 2022/0083634 A1 | 3/2022 | Chen | |
| 2023/0208966 A1 * | 6/2023 | Zheng | G06V 20/46 |
| | | | 379/189 |

(Continued)

OTHER PUBLICATIONS

New method detects deepfake videos with up to 99% accuracy, University of California, Riverside, Holly Ober, https://news.ucr.edu/articles/2022/05/03/new-method-detects-deepfake-videos-99-accuracy, May 3, 2022, 4 pages.

(Continued)

*Primary Examiner* — Jason K Lin
(74) *Attorney, Agent, or Firm* — Young Basile Hanlon & MacFarlane, P.C.

(57) ABSTRACT

A manipulation of a media stream associated with a manipulated participant of a communication session is identified. A notification of the manipulation is transmitted to a first participant of the communication session. An approval indication of the manipulation is received from the first participant. A determination is made that the approval indication indicates a disapproval of the manipulation. A request to disable the manipulation is transmitted to a second participant of the communication session.

17 Claims, 13 Drawing Sheets

(56) References Cited

U.S. PATENT DOCUMENTS

| | | |
|---|---|---|
| 2023/0359719 A1 | 11/2023 | Summerfield |
| 2023/0388440 A1* | 11/2023 | Chen ................... H04N 5/262 |
| 2023/0402041 A1 | 12/2023 | Headings et al. |
| 2024/0021211 A1* | 1/2024 | Deole ................. G10L 21/003 |
| 2024/0097925 A1* | 3/2024 | Palamadai ............ H04N 7/152 |
| 2024/0163367 A1 | 5/2024 | Frommelt et al. |
| 2024/0195904 A1 | 6/2024 | Min et al. |
| 2024/0220592 A1 | 7/2024 | Kunin et al. |

OTHER PUBLICATIONS

Detection and Localization of Facial Expression Manipulations, University of California, Riverside, Ghazel Mazaheri and Amit K. Roy-Chowdhury, 2022, 11 pages.

Detect Fakes, Attention Check, MIT Media Lab, https://detectfakes.media.mit.edu/, Jan. 2023, 1 page.

Detect DeepFakes: How to counteract misinformation created by AI, MIT Meida Lab, https://www.media.mit.edu/projects/detect-fakes/overview/, Jan. 2023, 6 pages.

Using AI to Detect Seemingly Perfect Deep-Fake Videos, Standord University, https://hai.stanford.edu/news/using-ai-detect-seemingly-perfect-deep-fake-videos, Edmund L. Andrews, Oct. 13, 2020, 5 pages.

Detecting Deepfake Video Calls Through Monitor Illumination, Unite.AI, https://www.unite.ai/detecting-deepfake-video-calls-through-monitor-illumination/, Martin Anderson, Dec. 9, 2022, 7 pages.

FakeBuster: A DeepFakes Detection Tool for Video Conferencing Scenarios, Cornell University, https://arxiv.org/abs/2101.03321, Vineet Mehta et al., Jan. 9, 2021, 4 pages.

* cited by examiner

NOTIFICATION OF MANIPULATIONS IN COMMUNICATION SESSIONS

FIELD

This disclosure relates generally to communications management and, more specifically, to identifying potentially inauthentic media.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
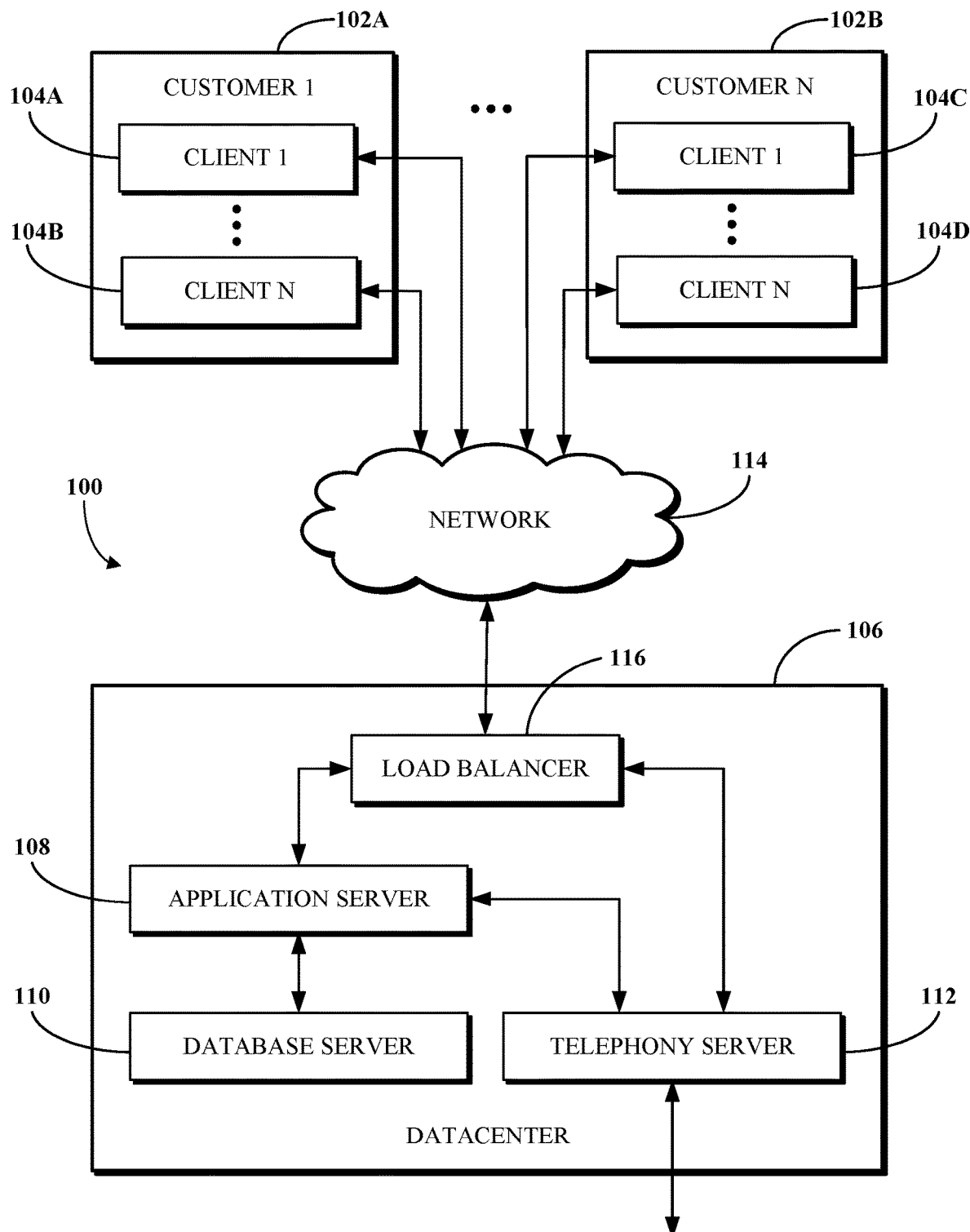
FIG. 1 is a block diagram of an example of an electronic computing and communications system.

Manipulation tools may be used to alter some aspect of (e.g., associated with) a participant in a communication session. A participant may apply a manipulation to another participant (i.e., to a media stream received from a device of the other participant) or may apply a manipulation to themselves (i.e., to a media stream originating from a device of the participant). The communication session can be an audio communication session (e.g., a telephone call) between two or more participants, an audio-visual conference that may include two or more participants, or some other type of communication session. The media stream that is manipulated may thus be an audio stream, a video stream, or an audio-visual stream.

A manipulation may generally be non-deceptive or deceptive. A non-deceptive manipulation is a manipulation that is obvious to the recipients and done without an intention to deceive or otherwise mislead the recipients. For example, a non-deceptive manipulation may be a superposition of the face of a cat on that of a video conference participant, such as using a filter. A deceptive manipulation is a manipulation intended to deceive or otherwise mislead the recipients. For example, a deceptive manipulation may cause the party using the manipulation to appear as someone else within a video stream, in an attempt to trick the recipient.

Some manipulations may be generated by deep-fake generation tools. Generative adversarial networks (GANs) are but one example of deep-fake generation tools. Manipulations generated by deep-fake generation tools are generally considered deceptive manipulations where the party using the manipulation does not inform the recipient of the use of the manipulations. With the accelerated improvements in manipulation technologies, it becomes more and more difficult for the average communication session participant to distinguish a real person from a person depicted within a video stream using a deceptive manipulation (i.e., the real person that the deep fake poses as). Deep fake technologies can be used, inter alia, to manipulate facial expressions; to superimpose a virtual face (e.g., a face intended to appear as that of another person) onto a real face; to alter expressions on original faces; or to ascribe speech to a person who has not uttered such speech. Manipulation tools can use digital signal processing techniques to manipulate media streams. In another example, voice processing techniques may be used to alter the voice pitch, timbre, inflection, cadence, or accent of a participant. In yet another example, a manipulation tool may be used in real time to alter the output language of a speaker while maintaining the voice characteristics of the speaker.

To reduce potential deceptions posed to communication session participants as a result of manipulations, a communication platform (e.g., a unified communications as a service (UCaaS) platform) should, at the least, warn participants of manipulations and/or suspected manipulations. However, traditional communication platforms are typically passive conduits of media streams. Communication platforms typically establish connections between participants (i.e., between devices thereof) and manage the transmission of media streams amongst connected participants. Communication platforms thus conventionally lack the technical capabilities to actively monitor for, and warn participants of, suspected manipulations.

Implementations of this disclosure address problems such as these by identifying indicia of inauthenticity of participants of a communication session and/or by using biometric marker libraries of participants to warn participants of potential inauthenticity of other participants. In some examples, manipulations may be enabled by (i.e., are under the control of) the software platform. That is, the software platform may include manipulation tools. In such cases, the software platform can notify participants of enabled manipulations (i.e., manipulations performed under the control of the software platform).

In an example, the software platform generates a biometric marker for a participant of a communication session based on a media stream received from a device of (e.g., associated with) the participant. User profiles associated with the biometric marker can be identified in a biometrics reference library. If the number of identified user profiles exceeds a threshold number, the software platform notifies another participant of a possible inauthenticity of the participant. In another example, a communications software determines a level of authenticity for a communication session participant of a communication session based on respective communications histories of at least some of the communication participants of the communication session. When inauthenticity is detected (e.g., suspected), the communications software may notify participants of the communication session. Inauthenticity can be detected (e.g., suspected) if the determined level of authenticity meets an inauthenticity criterion (such as if the level of authenticity is below an authenticity threshold). In yet another example, a manipulation of a first participant of a communication session may be performed under the control of a communications software. A notification of the manipulation is transmitted to a second participant of the communication session. An approval or disapproval of the manipulation may be received from the second participant. If the manipulation is disapproved, a request to disable the manipulation is transmitted to the participant that enabled the manipulation.

To describe some implementations in greater detail, reference is first made to examples of hardware and software structures used to implement at least one of multi-profile-based inauthenticity identification, history-based inauthenticity identification, or notification of manipulations in communication sessions. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, one or more of the clients 104A thorugh 104D or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, an SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
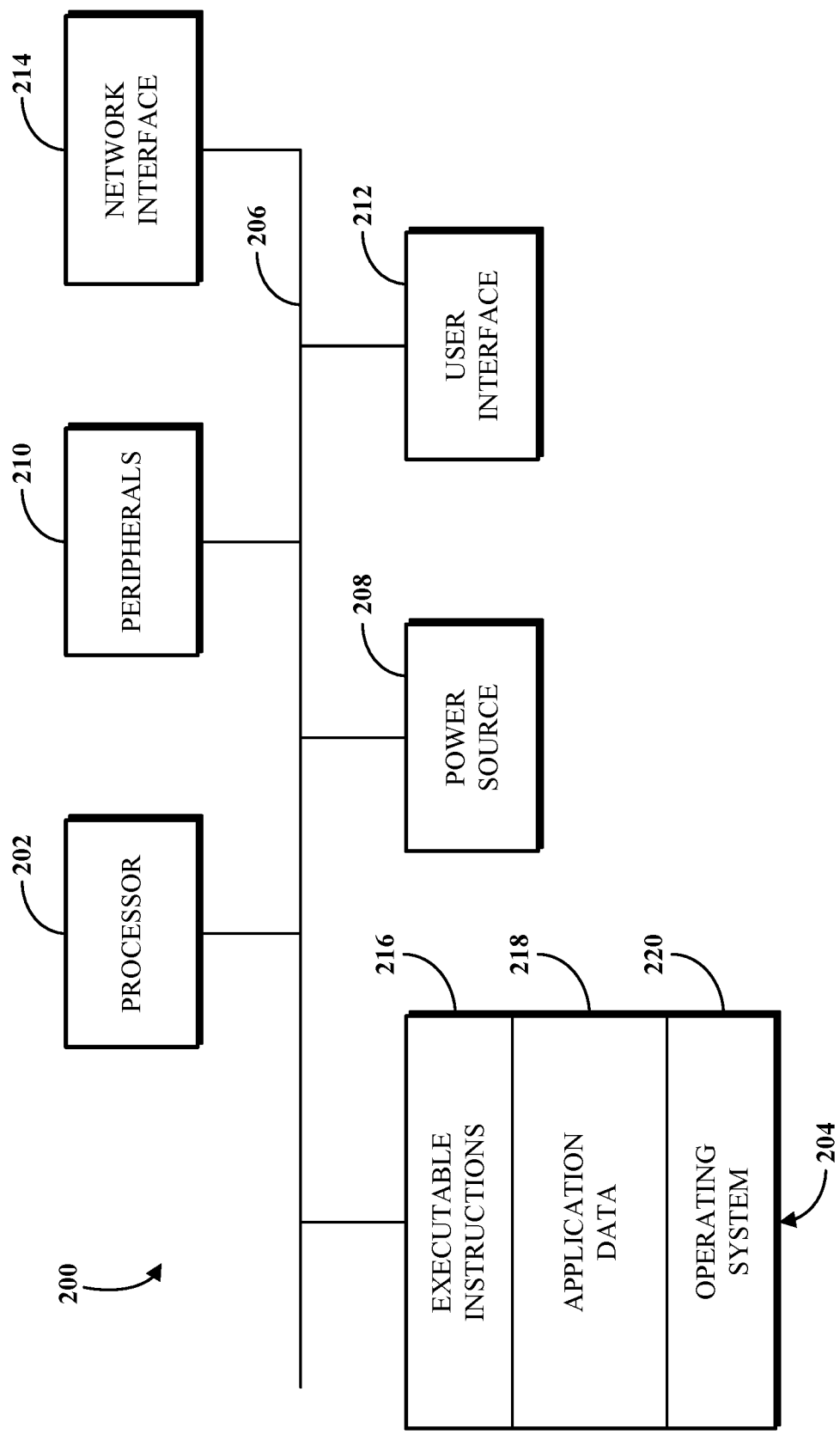
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the clients 104A through 104D, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
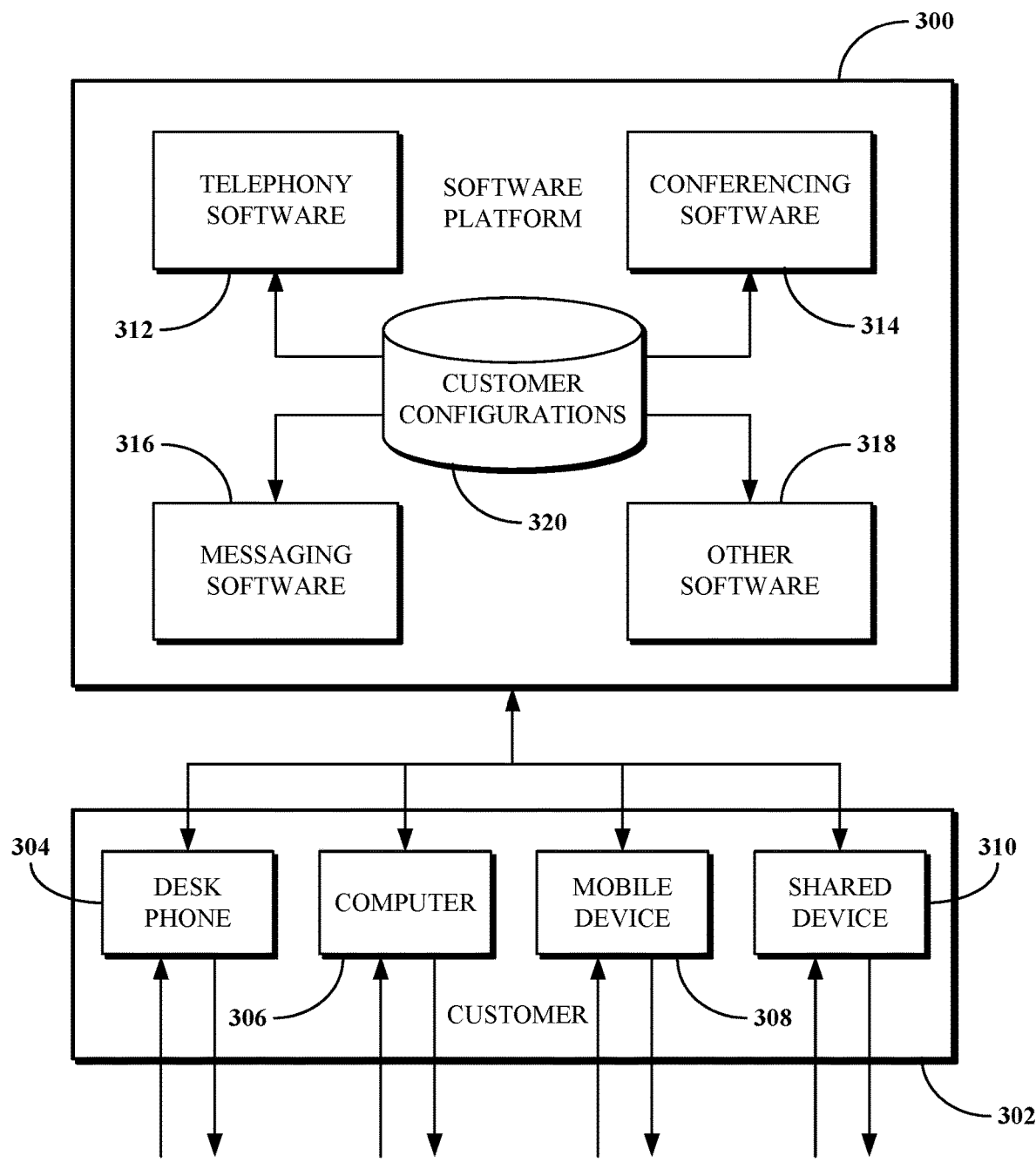
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients 304 through 310 (e.g., the clients 304, 306, 308, 310)—a desk phone, a computer, a mobile device, and a shared device. The desk phone is a desktop unit configured to at least send and receive calls and includes an input device for receiving a telephone number or extension to dial to and an output device for outputting audio and/or video for a call in progress. The computer is a desktop, laptop, or tablet computer including an input device for receiving some form of user input and an output device for outputting information in an audio and/or visual format. The mobile device is a smartphone, wearable device, or other mobile computing aspect including an input device for receiving some form of user input and an output device for outputting information in an audio and/or visual format. The desk phone, the computer, and the mobile device may generally be considered personal devices configured for use by a single user. The shared device is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, amongst the clients 304 through 310 be sent or received using the desk phone, a softphone running on the computer, a mobile application running on the mobile device, or using the shared device that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can be or include a manipulation detection software that can be used for at least one of multi-profile-based inauthenticity identification, history-based inauthenticity identification, or notification of manipulations in communication sessions.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
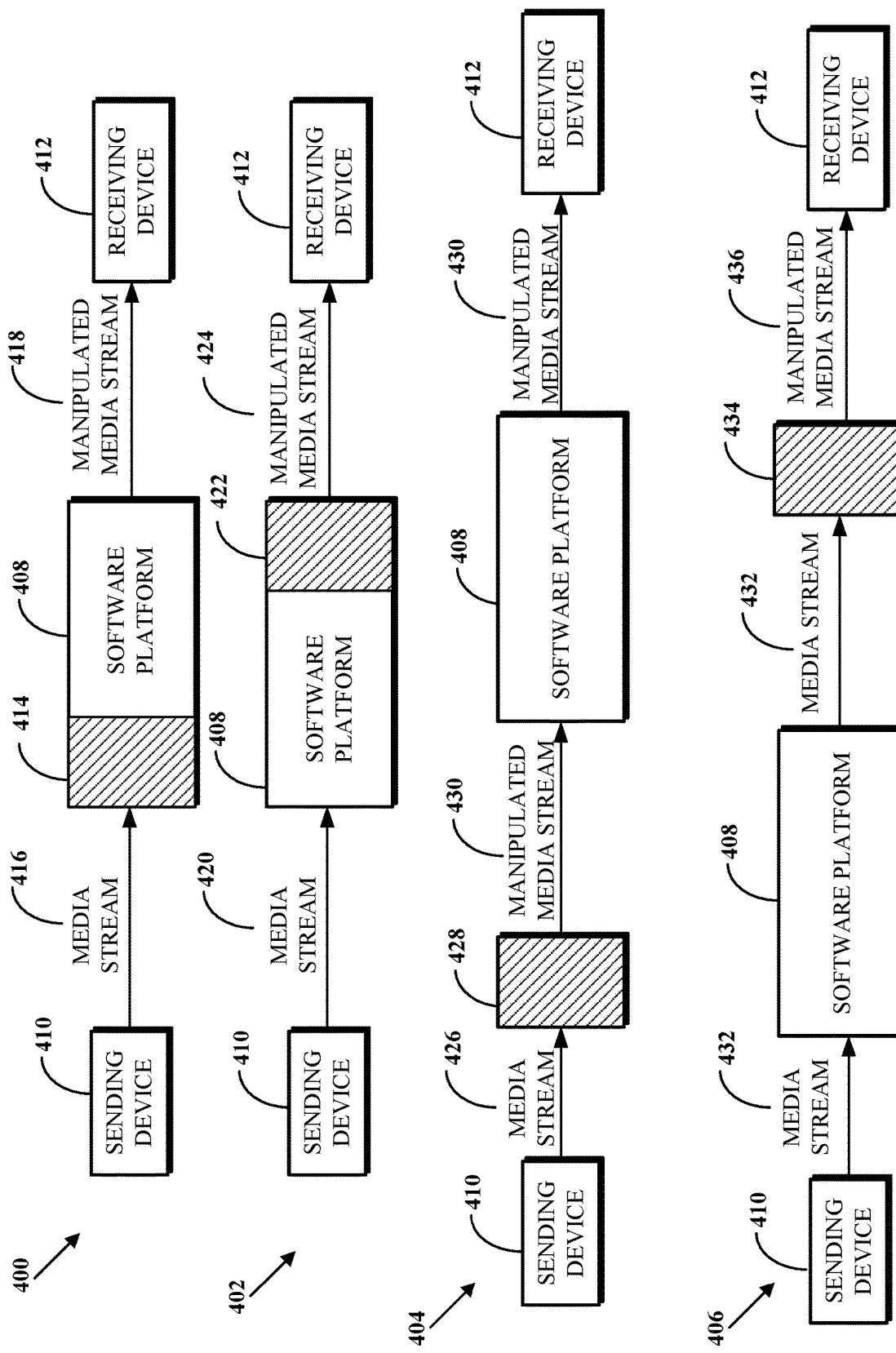
FIG. 4 illustrates examples of media stream manipulations.

FIG. 4 illustrates examples 400, 402, 404, and 406 of media stream manipulations. Specifically, the examples 400, 402, 404, and 406 illustrate respective scenarios for where, along a path from a sending device to a receiving device, a manipulation of a source media stream that initiates from the sending device may occur therewith producing a manipulated media stream that is received at the receiving device. As used herein, a device transmitting a media stream is referred to herein as a "sending device;" and a device that receives a media stream transmitted from a sending device is referred to herein as a "receiving device."

It is noted that the examples shown in FIG. 4 are not intended to constitute an exhaustive list of possible scenarios. Thus, a manipulation may be generated along a path that is different from those shown in FIG. 4. It is also noted that the examples 400, 402, 404, and 406 are not mutually exclusive. That is, two or more of the illustrated scenarios are concurrently possible.

In each of the examples 400 through 406, a software platform 408 implements a communication session to which a sending device 410 and a receiving device 412 are connected. The software platform 408 can, for example, be the software platform 300 of FIG. 3. The sending device 410 and/or the receiving device 412 can, for example, be a client, such as described with respect to the clients 304 through 310. In an example, at least one of the sending device 410 or the receiving device 412 may not be registered with the software platform 408 (e.g., associated with a user account of the software platform 408). To illustrate, one of the users of the sending device 410 or the receiving device 412 may be a registered user of a telephone service and/or conference services not provided by the software platform 408 while the other of the users may be a registered user of the software platform 408.

In the example 400, the software platform 408 includes or works in conjunction with a manipulation tool 414. In such a case, the manipulation tool 414 can be said to be integrated with or into the software platform 408. That the software platform 408 works in conjunction with the manipulation tool 414 can include that the manipulation tool 414 provides services that are programmatically accessible to or via the software platform 408 to provide media stream manipulations and/or that the manipulation tool 414 programmatically accesses services of the software platform 408 to provide the software platform 408. Additionally, the manipulation tool 414 may be executing at the sending device 410 within, or in conjunction with, a communications application (e.g., a client application) associated with the software platform 408. As such, the software platform 408 can be said to include or otherwise obtain (such as from the manipulation tool 414) data indicating whether a manipulation provided by the manipulation tool 414 is enabled. In some examples, the software platform 408 may include or obtain from the manipulation tool 414 data descriptive (e.g., a textual description) of a particular manipulation applied.

A media stream 416 that initiates from the sending device 410 may be manipulated by the manipulation tool 414 to obtain a manipulated media stream 418 before the software platform 408 transmits the manipulated media stream 418 to the receiving device 412. In such a case, the manipulated media stream 418 is output at (and is perceived, experienced, consumed, listened to, or watched by a participant using) the receiving device 412. In the example 400, the manipulation may be initiated (e.g., enabled, turned on, or selected) by the sending participant (i.e., the participant using the sending device 410). While not specifically shown in the example 400, and consistent with the foregoing description, the software platform 408 may in fact receive the manipulated media stream 418 from the sending device 410.

In the example 400, the manipulation tool 414 is graphically shown as being on the side of the sending device 410 to indicate that the manipulation is selected by the sending participant (i.e., the participant using the sending device 410).

In the example 402, a media stream 420 is manipulated by a manipulation tool 422 to obtain a manipulated media stream 424. The manipulation tool 422 is integrated with or into the software platform 408. In the example 402, the manipulation tool 422 is graphically shown as being on the side of the receiving device 412 to indicate that the manipulation is selected by the receiving participant (i.e., the participant using the receiving device 412). That is, the receiving participant has selected a manipulation of the media stream of the sending participant. Consistent with the foregoing description, the manipulated media stream 424 may be generated at the software platform 408 or at an application associated with the software platform 408 and executing at the receiving device 412.

In an example, the manipulated media stream 424 may be generated by the receiving participant for use (e.g., consumption) only by the receiving participant. In another example, the manipulated media stream 424 may be generated by the receiving participant for use by other participants of the communication session. To illustrate, the sending participant may be an English speaker while the receiving participant may be a German speaker. The receiving participant may select a manipulation tool that performs simultaneous translation of the English speech to German. The receiving participant may direct the software platform 408 to transmit the manipulated media stream 424 to other receiving participants.

In the example 404, a manipulation tool 428 may perform a manipulation of a media stream 426 to obtain a manipulated media stream 430 where the manipulation is not under the control of the software platform 408. That is, the software platform 408 does not have an explicit indication that the media stream 426 is being manipulated (in other words, the software platform 408 may not be aware (e.g., does not include data indicating) that it is receiving a manipulated media stream 430 in place of a non-manipulated media stream 426). The manipulation tool 428 is not integrated with or into the software platform 408. The software platform 408 receives the manipulated media stream 430 and retransmits it to the receiving device 412. As an example of such manipulation, the sending participant may enable use of their camera during a communication session so that their video stream can be transmitted to other communication session participants. The manipulation tool 428, which may be executing on a sending device, and which may be or include a deep-fake generation tool, may substitute the face of the sending participant with the face of another person. The mannerisms, lip movements, and other facial and gestural behaviors of the participant are presented in the video stream but with the substituted face as the face of the sending participant. The deep-fake generation tool may also replace the voice of the sending participant with that of the other person.

In the example 406, a media stream 432 of a sending participant may be manipulated downstream from the software platform 408 by a manipulation tool 434 to obtain a manipulated media stream 436, which is received by the receiving device 412. In such a case, the manipulation tool 434 is not integrated with or into the software platform 408. For example, the manipulation tool 434 may be integrated with the receiving device 412. As another example, the manipulation tool 434 may be part of a software service that is remote from the receiving device 412.

To summarize, in the example 400, a participant transmitting a media stream may select a manipulation that is to be applied to their media stream where the software platform 408 can be said to be aware of the manipulation; in the example 402, a participant receiving a media stream of another participant may select a manipulation that is to be applied to the received media stream where the software platform 408 can be said to be aware of the manipulation; in the example 404, a media stream is manipulated before being received by the software platform 408 and where the manipulation is not under the control of the software platform 408; and in the example 406, a media stream received at the software platform 408 from a sending device and transmitted to a receiving device is manipulated prior to being perceived at the receiving device and where the manipulation is not performed under the control of the software platform 408.

In another example, not shown FIG. 4, a media stream may be manipulated after the communication session concludes. To illustrate, a virtual event (e.g., a virtual technical presentation, a virtual political rally, or a TV show broadcast) may be recorded so that it can be made available (such as via a worldwide or a limited-audience content delivery platform or a social media platform) for later viewing. The recording may be manipulated prior to being made available for later playback such that a speaker may be heard expressing points of view or making statements the speaker did not in fact make during the virtual event or so that an appearance of the speaker may be different from their appearance during the virtual event.

Figure 5:
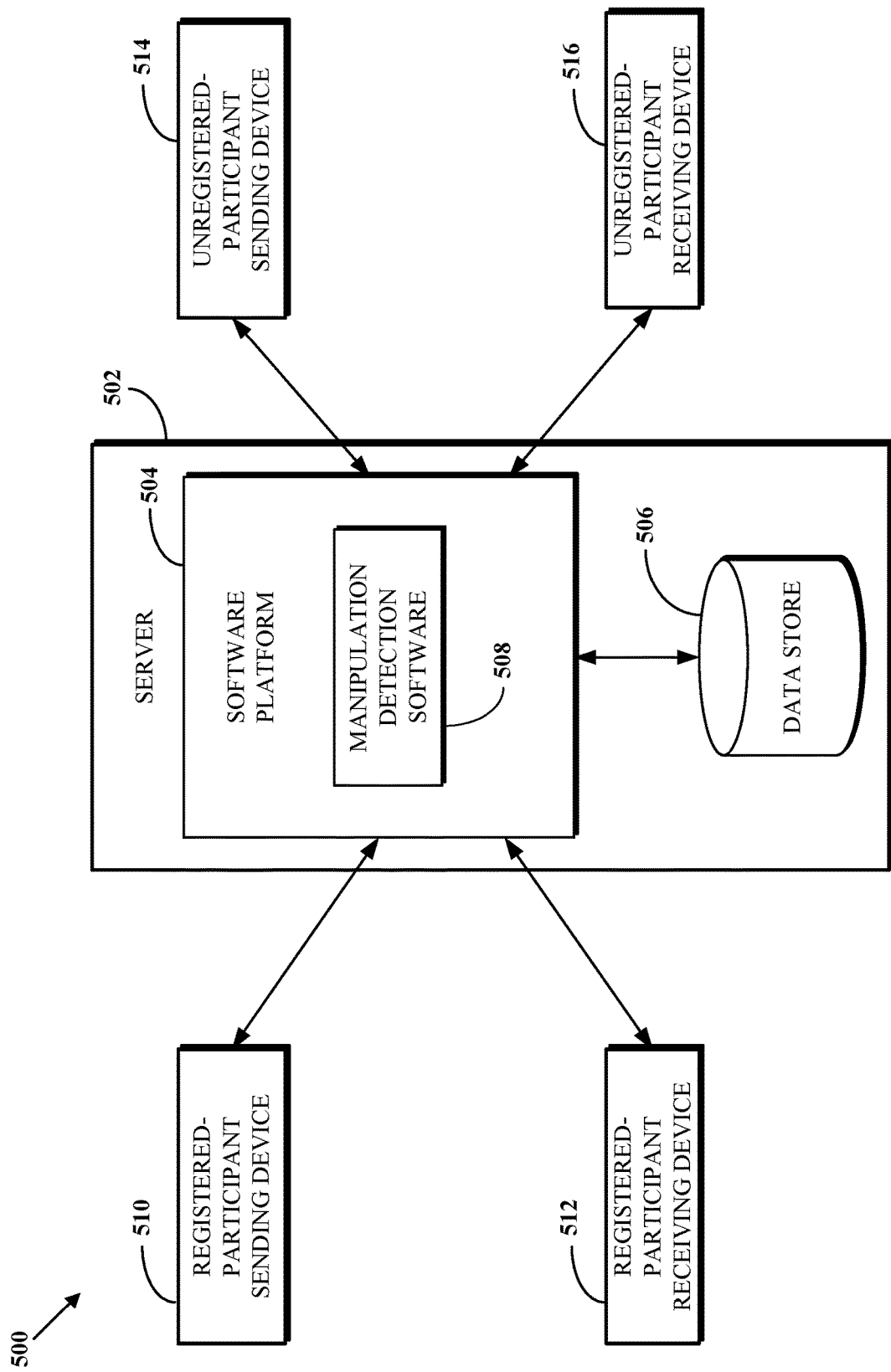
FIG. 5 is a block diagram of an example of a system for manipulation detection.

FIG. 5 is a block diagram of an example of a system 500 for manipulation detection. The system 500 includes a server 502 that enables users to participate in (e.g., virtually join) communication sessions. As shown, the server 502 implements or includes a software platform 504 and a data store 506. The server 502 can be one or more servers implemented by or included in a datacenter, such as the datacenter 106 of FIG. 1. The software platform 504 provides communication services (e.g., capabilities or functionality) via a communication software (not shown). The software platform 504 can be or can be part of the software platform 300 of FIG. 3 or can be the software platform 408 of FIG. 4. The communication software can be variously implemented in connection with the software platform 504. In some implementations, the communication software can be, can be included in, or can work in conjunction with one or more of the telephony software 312, the messaging software 316, or the other software 318 of FIG. 3. For example, the communication software may be or may be integrated within the conferencing software 314.

A participant in a communication session enabled by the software platform 504 can be a registered participant or an unregistered participant. A registered participant is one that may have a user account (e.g., a profile) registered with the software platform 504. As such, the data store 506 may include credentials via which the registered user can use the services of the software platform 504. The data store 506 may also include other data related to the registered user, as further described herein. An unregistered participant is one that may use the services of the software platform 504 without first providing credentials to the software platform 504. As such, the data store 506 may not include data related to the unregistered participant. In some examples, a registered participant may be, in the context of a communication session, an unregistered participant. To illustrate, a registered participant may be an invitee to a communication session that the registered participant joins without first providing their credentials. As such, with respect to this particular communication session, the registered participant is not identified as a registered participant.

A participant accesses the services of the software platform 504 via a device, which may include or execute an application (e.g., a software or tool(s)) associated with the software platform 504. The devices of a registered participant and an unregistered participant are referred to herein as a "registered-participant device" and an "unregistered-participant device," respectively. As mentioned above, a media stream may be transmitted from a device of a participant (a sending device) and received at a device of another participant (a receiving device). As such, FIG. 5 illustrates that a registered-participant sending device 510, a registered-participant receiving device 512, an unregistered-participant sending device 514, and an unregistered-participant receiving device 516 may be connected to one or more communication sessions enabled by the software platform 504. As can be appreciated, more or fewer devices than those illustrated in FIG. 5 may be connected to the software platform 504 at any point in time. Additionally, the software platform 504 may enable many (e.g., thousands) simultaneous communication sessions.

The data store 506 stores data related to participants and communication sessions, as further described herein. The data store 506 can be included in or implemented by a database server, such as the database server 110 of FIG. 1. The data store 506 can include data related to scheduled or ongoing communication sessions and data related to registered participants of the software platform 504. The data store 506 can include one or more directories of registered participants. Information associated with a participant and stored in the data store 506 can include one or more of an office address, a telephone number, a mobile telephone number, an email address, project or group memberships, a contact list, and the like. Alternatively, the contact list associated with a participant may be stored in the data store 506 separate from the other information associated with the participant.

The data store 506 can include communication session history data. For example, the data store 506 can include data related to communication sessions that a particular participant has participated in. The data can include data indicating types of those communication sessions. For example, a communication session may be an audio, video, an audio-video communication session; a communication session can be a one-on-one or a multi-participant communication session. Other types of communication sessions are possible. The communication session history data can be used to identify callees of and callers of a particular participant. A callee refers to a participant that participates in a communication session initiated by another participant; and a caller refers to a participant that initiates a communication session with another. To illustrate, a caller may initiate a telephone call to, or may initiate (e.g., host or schedule) a video conference with, another participant; and a callee may be a recipient of a telephone call or may participate in a video conference that is initiated by someone else.

Figure 6:
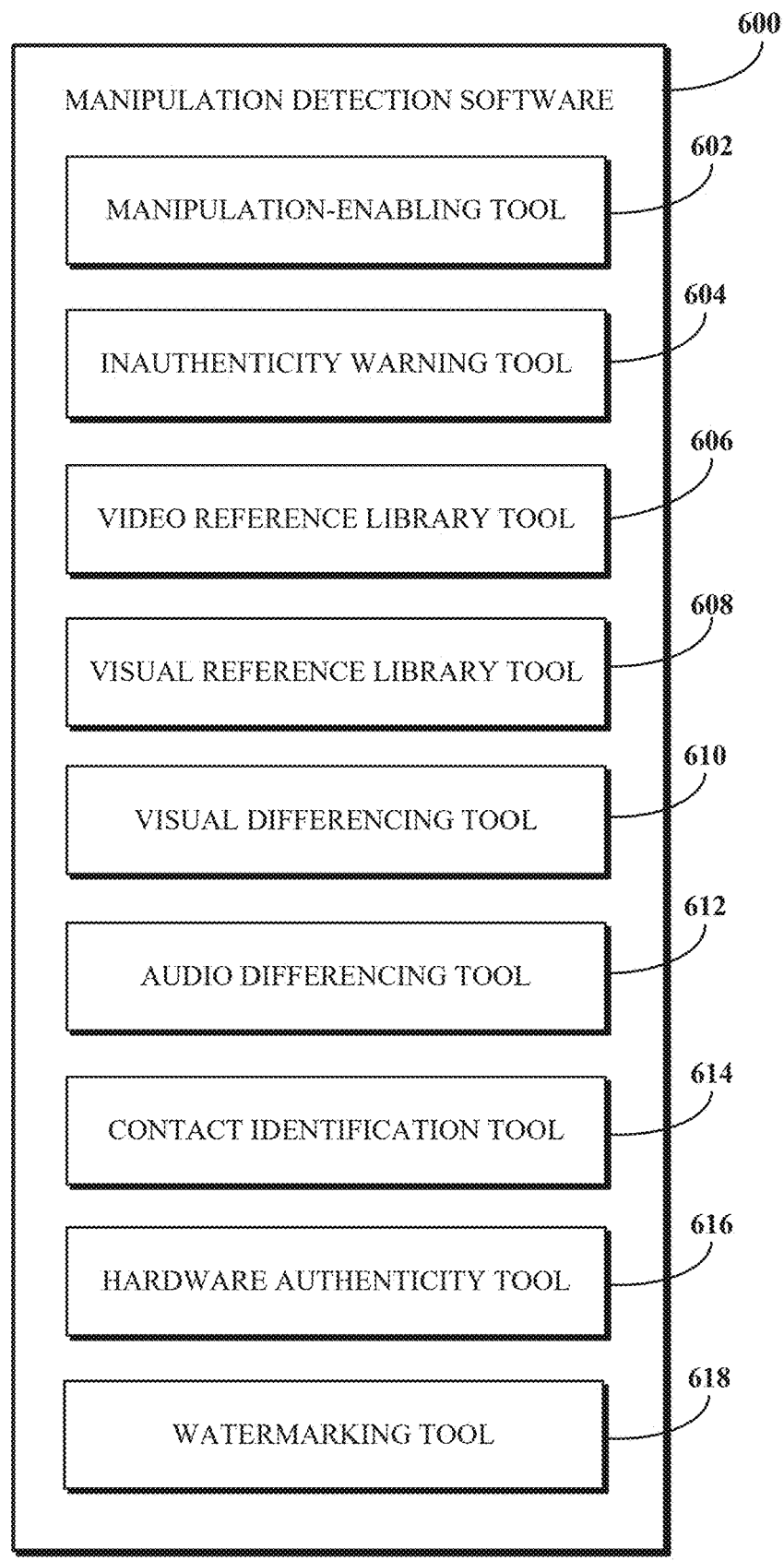
FIG. 6 is a block diagram of example functionality of a manipulation detection software.

The software platform 504 includes a manipulation detection software 508, which is further described with respect to FIG. 6. Briefly, the manipulation detection software 508 can indicate to a participant when manipulations are enabled and/or when manipulations are suspected; can identify potential manipulations based on biometric markers; can warn participants of potential deceptive manipulations; and/ or can identify potential manipulations performed outside of the control of the software platform 504.

FIG. 6 is a block diagram of example functionality of a manipulation detection software 600, which may be, for example, the manipulation detection software 508 of FIG. 5. The manipulation detection software 600 may be included in or work in conjunction with a software platform, such as the software platform 504 of FIG. 5. The manipulation detection software 600 includes tools, such as programs, subprograms, functions, routines, subroutines, operations, executable instructions, and/or the like for, inter alia and as further described below, generating a unified video stream for a video conference. As described with respect to FIG. 5, the manipulation detection software 600 may be included in a software platform that provides communications services.

At least some of the tools of the manipulation detection software 600 can be implemented as respective software programs that may be executed by one or more computing devices, such as the computing device 200 of FIG. 2. A software program can include machine-readable instructions that may be stored in a memory such as the memory 204, and that, when executed by a processor, such as processor 202, may cause the computing device to perform the instructions of the software program.

As shown, the manipulation detection software 600 includes a manipulation-enabling tool 602, an inauthenticity warning tool 604, a voice reference library tool 606, a visual reference library tool 608, a visual differencing tool 610, an audio differencing tool 612, a contact identification tool 614, a hardware authenticity tool 616, and a watermarking tool 618. In some implementations, the manipulation detection software 600 can include more or fewer tools. In some implementations, some of the tools may be combined, some of the tools may be split into more tools, or a combination thereof. The tools of the manipulation detection software 600 are used to detect and warn of possible manipulations of media streams of communication session participants. Each of the tools can be used separately, in conjunction with other one or more other tools, for such purpose.

The manipulation-enabling tool 602 determines that a manipulation is applied to a participant of a communication session. That a manipulation is applied to a participant can mean that the manipulation is applied to a media stream associated with the participant, which may be a media stream transmitted from a device of the participant. The manipulation-enabling tool 602 can notify one or more participants of the communication session about the manipulation.

In an example, a sending participant may transmit a command to the manipulation detection software 600 or the software platform to enable a manipulation of the media stream of the sending participant. The manipulation-enabling tool 602 may transmit a notification to one or more of the communication session participants indicating that they are receiving a manipulated media stream. As indicated above, that a media stream is manipulated can mean that media (e.g., video and/or audio) data captured using input/output peripherals (e.g., camera and/or microphone) at the sending device are different from what the receiving participants perceive. For example, the media stream may be manipulated if a digital hat is added to (e.g., digitally overlaid onto images of) the sending participant.

The manipulation-enabling tool 602 may augment the manipulated media stream to indicate that it is a manipulated stream. To illustrate, the manipulation-enabling tool 602 may overlay a textual message or a graphical indicator (e.g., an icon) over the manipulated media stream that essentially states that "this stream is manipulated." The manipulation-enabling tool 602 may also add metadata to the manipulated media stream that indicates to the receiving device 412 that manipulation has been added. The metadata may specify what manipulations are added or may indicate an inauthenticity score (e.g., an inauthenticity score of 92 may indicate that 92% of the media stream has been manipulated). In an example, the manipulation-enabling tool 602 may first obtain a permission from the sending user to notify the other participants of the manipulation, as described with respect to FIG. 7.

In an example, a receiving participant may transmit a command to the manipulation detection software 600 or the software platform to enable a manipulation of a media stream of the sending participant. In an example, the manipulation-enabling tool 602 may transmit an indication of the manipulation to the sending participant. In an example, the sending participant may be prompted to permit the manipulation, as described with respect to FIG. 8.

The inauthenticity warning tool 604 identifies indicia of authenticity associated with a participant. In an example, the inauthenticity warning tool 604 can notify other participants of a level of authenticity (or level of trust) identified for a participant. The inauthenticity warning tool 604 may associate an "unknown" authenticity level with unregistered participants. Registered participants may authenticate with the software platform using a number of mechanisms. An authenticity level may be associated with each such mechanism. For example, the inauthenticity warning tool 604 may associate a "low" authenticity level with a simple username/password authentication mechanism. For example, the inauthenticity warning tool 604 may associate higher authenticity level with stronger authentication mechanisms, such as those that are based on certificate or asymmetrical key pair and/or where credentials providing access to the software platform are bound to a device of the participant.

The level of authenticity (or level of trust) may indicate how likely a participant is who they claim to be. For example, if a participant has used iris scanning tools for authentication prior to joining the meeting, the level of authenticity may be very high. As another example, if a participant has recently used a password recovery tool without additional authentication, the level of authenticity may be very low. In one configuration, the level of authenticity may be correlated with the number of authenticity mechanisms associated with the participant account. For example, a participant account that is configured to have multiple authentication mechanisms (and that switches randomly between the authentication mechanisms every time the participant is required to authenticate) may be deemed to have a higher level of authenticity when a user has passed one authentication mechanism than a participant account with only one authentication mechanism supported.

In the case of a video-enabled communication session, the authenticity levels of participants may be indicated (such as textually or using icons) in their respective tiles. A tile, as used herein, refers to a user interface component (e.g., a panel, a window, or a box) that can be used to display a video stream depicting one or more conference participants. In a multi-participant communication session, a communication software may receive media video streams from multiple devices joined to the communication session. Each video stream may be displayed in its own tile.

In an example, the callee is proactively notified of the level of authenticity if the level of authenticity is below a predefined threshold. In another example, the callee may request the authenticity level of the caller from the inauthenticity warning tool 604.

In the case of an audio-based communication session, one participant may obtain the authenticity level of another participant using verbal commands directed to the inauthenticity warning tool 604. To illustrate, the user may enter a key combination (e.g., a long press of the #key) to indicate that the participant is about to issue a command. The participant may then essentially ask "what is the authenticity level of the person I am talking to?" In another example, one participant may obtain the authenticity level of another participant using a key combination (e.g., "##51").

In an example, the inauthenticity warning tool 604 can identify indicia of inauthenticity based on a calling history of a caller, which may be available in a data store, such as the data store 506 of FIG. 5. To illustrate, a registered participant may initiate a communication session with an unregistered participant. The inauthenticity warning tool 604 may determine whether the calling history of the registered user is indicative of an inauthentic caller (i.e., the registered participant). The inauthenticity warning tool 604 may determine a level of authenticity of the caller using one or more factors (such as whether the recent calling history differs significantly from the overall calling history). To illustrate, a caller that normally makes three calls per week may have a higher level of authenticity than a caller that has made over 100 calls in a 20 minute period. The level of authenticity may be obtained as a weighted sum of the factors. In another example, a machine learning model may be trained to output the level of authenticity based on the factors.

In an example, the manipulation detection software 600 may transmit a warning message to a device of the callee indicating the level of authenticity of the caller. In another example, the manipulation detection software 600 may inject a private (i.e., not heard by the caller) verbal message to the callee into the communication session. To illustrate, the private message may essentially state, "Pardon the interruption, we wanted you to know that a low authenticity level is associated with the person you are communicating with."

The factors used may include one or more of a number of distinct callees that the caller has called within a certain period of time (e.g., one week), a number of unique areas (e.g., geographic locations or area codes) that the caller has called within the period of time, a number of times that the caller has called the callee, a rate (e.g., calls per unit of time) at which the caller has called the callee within a certain period of time, the authentication level of the caller, the recency (e.g. age) of the registration of the caller with the software platform, and triggering keywords or phrases uttered by the caller. The inauthenticity warning tool 604 may actively listen for triggering keywords or phrases that may be associated with scam, fraudulent, or inauthentic calls. Examples of such of triggering keywords include "money," "bank account," "password," "credit card," and "gift card."

In an example, the inauthenticity warning tool 604 identifies indicia of inauthenticity based on a calling history of a callee, which may be available in a data store, such as the data store 506 of FIG. 5. To illustrate, an unregistered participant (i.e., a caller) may initiate a communication session with a registered participant (i.e., a callee). The inauthenticity warning tool 604 may determine whether the calling history of the registered user (i.e., the callee) is indicative of an inauthentic caller (i.e., the unregistered participant).

The inauthenticity warning tool 604 may determine a level of authenticity of the caller using one or more factors. The factors may include a number of times that the callee has been called by the caller (e.g., from the current telephone number of the caller) within a predefined period of time, whether and/or a number of times that the callee has previously called the caller, or triggering keywords and/or phrases uttered by the caller. The level of authenticity of the caller may be determined as described above. The callee may be notified of the level of authenticity as also described above.

In another example, both of the caller and the callee may be registered participants. As such, the inauthenticity warning tool 604 may identify a level of authenticity of the caller using features obtained using a calling history of the caller and features obtained using a calling history of the callee. It is noted that while the foregoing describes identifying an authenticity level associated with a caller, the same principals apply with respect to identifying an authenticity level associated with a callee.

The voice reference library tool 606 maintains a voice biometrics reference library of participants in communication sessions. The voice biometrics reference library associates voice biometrics with participant metadata extracted from communication sessions. The voice biometrics reference library can be used to identity whether different voice biometrics are associated with the same metadata. That different voice biometrics are associated with the same participant metadata can mean or can be indicative of (e.g., can be used to infer) deceptive manipulations. The voice biometrics are used for metadata matching and are not used for identification of specific participants. As such, the voice biometrics cannot be considered to be personally identifiable information. The voice biometrics may be stored for short durations of time. In an example, a communication session participant may opt-out of having their voice biometrics obtained and associated with metadata extracted from communication sessions (at the cost of potentially reduced authenticity scores).

To illustrate, a caller may initiate a first communication session from a telephone number to a first callee where the caller has manipulated their voice to be that of a relative of the first callee; and that same caller may at a later time initiate a second communication session from the same telephone number to a second callee where the caller has manipulated their voice to be that of an acquittance of the second callee. As such, the voice biometrics reference library can include a first association of a first voice biometric (obtained based on the voice of the relative) with the telephone number and a second association of a second voice biometric (obtained based on the voice of the acquaintance) with the telephone number. Maintaining (e.g., constructing, building, or populating) the voice biometrics reference library is described with respect to FIG. 9.

The visual reference library tool 608 maintains a facial biometrics reference library of participants in communication sessions. The facial biometrics reference library associates facial biometrics with participant metadata. The facial biometrics reference library can be used to identity whether facial biometrics are associated with the same metadata. That different facial biometrics are associated with the same metadata can mean or can be indicative of deceptive manipulations. The facial biometrics reference library and the facial biometrics reference library can be referred to collectively or individually as a biometrics reference library. Voice biometrics and facial biometrics can be referred to collectively or individually as a participant biometrics. The facial biometrics are used for metadata matching and are not used for identification of specific participants. As such, the facial biometrics cannot be considered to be personally identifiable information. The facial biometrics may be stored for short durations of time. In an example, a communication session participant may opt-out of having their facial biometrics obtained and associated with metadata extracted from communication sessions (at the cost of potentially reduced authenticity scores).

To illustrate, a caller may initiate a first communication session (i.e., a first video communication session) using a device that is assigned an IP address to a first callee where the caller has manipulated their video stream to be that of a relative of the first callee; and that same caller may at a later time initiate a second communication session (i.e., a second video communication session) from the same device to a second callee where the caller has manipulated their video stream to be that of an acquaintance of the second callee. As such, the facial biometrics reference library can include a first association of first facial biometrics (obtained based on the likeness of the relative in the video stream) with the device and/or the IP address; and a second association of second facial biometrics (obtained based on the likeness of the of the acquaintance in the video stream) with the device and/or the IP address. Maintaining (e.g., constructing, building, or populating) the facial biometrics reference library is described with respect to FIG. 9.

The visual differencing tool 610 can be used to detect whether a manipulation that modifies the visual appearance of a participant is applied by comparing one or more startup images of the participant with images later obtained from the media stream of the participant.

In an example, based on a participant joining a communication session via a device, one or more initial images of the participant can be obtained from a camera of the device. For example, the visual differencing tool 610 may receive from a communications application executing or available at the device one or more images. The visual differencing tool 610 extracts initial facial biometrics from the initial images.

As the device is transmitting a video stream of the participant during the communication session, the visual differencing tool 610 may regularly (e.g., every 5 second or 10 seconds) select (e.g., extract) current images from the video stream. Current facial biometrics are obtained from the one or more current images. The initial facial biometrics are compared to the current facial biometrics to obtain a match score. If the match score is below a threshold (e.g., 80%) then the manipulation detection software 600 notifies other participants, as described herein, that the media stream of the participant may be manipulated. In an example, the other participants may be notified of a degree of manipulation of the current video stream of the participant. The degree of manipulation may be or may be based on the match score. In an example, the degree of manipulation may be displayed in association with a tile that displays the media stream. The degree of manipulation may be expressed as a textual or graphical percent value.

In an example, the visual differencing tool 610 may separately compare one or more of foreground image data, background image data, and/or facial image data. For example, trained image segmentation machine learning models may be used to obtain (from the initial images and from the current images) respective foreground segments, background segments, and facial segments. As such, the visual differencing tool 610 may obtain respective visual foreground features, visual background features, and visual facial biometrics. The visual differencing tool 610 can notify participants of the extent to which each of the foreground segment, the background segment, and/or the facial segment of the participant has been manipulated.

In another example, upon a participant joining a video communication session, the visual differencing tool 610 may prompt the participant to perform certain gestures designed or known to detect whether the video media stream of the participant is already being manipulated. That is, the visual differencing tool 610 attempts to determine whether the manipulation detection software 600 received an already manipulated media stream. The gestures are intended to induce visual anomalies caused by deep-fake generations and wherein the anomalies can be identified (e.g., detected) using machine learning. To illustrate, the participant may be asked to turn sideways or to stick their finger on the side of their nose. Both of these gestures may be likely to result in visual anomalies. In response to detecting visual anomalies, the manipulation detection software 600 may notify other participants that the media stream of the participant may be manipulated. In an example, if the participant declines the prompt from the visual differencing tool 610 (e.g., does not perform the gestures), then the level of authenticity score associated with the participant can be reduced.

The audio differencing tool 612 can be used to detect whether a manipulation that modifies the speech of a participant is applied by comparing one or more initial voice samples of the participant with current voice samples obtained from the media stream of the participant.

In an example, responsive to a participant joining a communication session via a device, one or more initial speech samples of the participant are obtained via a microphone of the device. For example, the audio differencing tool 612 may receive from a communications application executing or available at the device a command to capture and transmit one or more speech samples to the audio differencing tool 612. The audio differencing tool 612 extracts initial speech features from the initial voice samples.

As the device is transmitting an audio stream of the participant during the communication session, the audio differencing tool 612 may regularly (e.g., every 1 minute or every 5 minutes) select (e.g., extract) current speech samples from the audio stream. Current speech features can be obtained from the one or more current speech samples. The initial speech features are compared to the current speech features to obtain a match score. If the match score is below a threshold (e.g., 80%) then the manipulation detection software 600 notifies other participants, as described herein, that the media stream of the participant may be manipulated. In an example, the other participants may be notified of a degree of manipulation of the current audio stream of the participant. The degree of manipulation may be or may be based on the match score.

The contact identification tool 614 can be used to identify a contact in a contact list based on a voice biometrics or facial biometrics. A participant may have a contact list that may include other persons or entities that the participant frequently holds communication sessions with. When a person is in a communication session with a person included in the contact list of the participant, the contact identification tool 614 may obtain, depending on the types of the communication session, facial biometrics and/or voice biometrics for the person using a media stream of the person in the communication session. The contact identification tool 614 may associate the facial biometrics and/or voice biometrics with the person in the contact list. An example of operations of the contact identification tool 614 is described with respect to FIG. 10.

The hardware authenticity tool 616 is used to identity whether a manipulation may have been performed by (e.g., at or nearly at) a peripheral device. That a manipulation is performed by a peripheral device can mean or include that a media stream received at the device of a participant by a communication application associated with the software platform is already a manipulated media stream. The peripheral device may be a camera or a microphone. In an example, the firmware of the peripheral device may include a tool that receives a media stream and outputs a manipulated media stream. In another example, a device driver of the peripheral device may perform the manipulation.

The hardware authenticity tool 616 receives peripheral device information from the device. The peripheral device information may include one or more of manufacturer information, firmware version, and/or device driver name and version. The hardware authenticity tool 616 uses peripheral device information to determine whether the media stream from the device may be a manipulated media stream. The hardware authenticity tool 616 may have access to a repository of peripheral device types, firmware data, or device drivers that are known to output manipulated media streams. The repository may be publicly available, such an internet-based public repository.

The watermarking tool 618 transmits watermarks to devices connected to a communication session. A watermark can be an image mask and/or an audio mask. In an example, the watermark transmitted by the watermarking tool 618 may be a set of rules that a device can use to obtain a mask. The masks can be small and randomly generated. "Small" in the sense that they are not perceptible by a human. An image mask may be used to embed a pattern (which may not necessarily consist of consecutive or connected pixels) in the video stream (or at least some images therein) transmitted from the device. Embedding the pattern can mean replacing pixel values of images of the video stream with the pixel values of the image mask. As another illustration, the watermark may correspond to modifying the audio stream transmitted from the sending device. Modifying the audio stream can include injecting tones in at least some of the audio frames of the audio stream at a frequency that cannot be sensed by a human.

In an example, the watermarking tool 618 can associate one watermark with a communication session. As such, the watermark is transmitted to each device connected to the communication session. In another example, a respective watermark can be associated with each device that connects to a communication session. When a device connects to a communication session, the watermarking tool 618 transmits the watermark to the device. The device (e.g., a client application therein) embeds the watermark in streams transmitted from the device.

In an example, the watermarking tool 618 checks whether a stream received from a device includes the watermark associated with the device. If the stream does not include the expected watermark, the watermarking tool 618 notifies the other participants of a potential manipulation.

In another example, the watermarking tool 618 transmits watermarks to receiving devices as well. To illustrate, when a device connects to a communication session, the watermark transmitted to the device is also transmitted to all other devices currently or later connected to the communication session. As such, a client application executing in a receiving device can check whether a received stream includes the expected watermark (i.e., the watermark associated with the device). If not, the client application notifies the participant of a potential manipulation.

Figure 7:
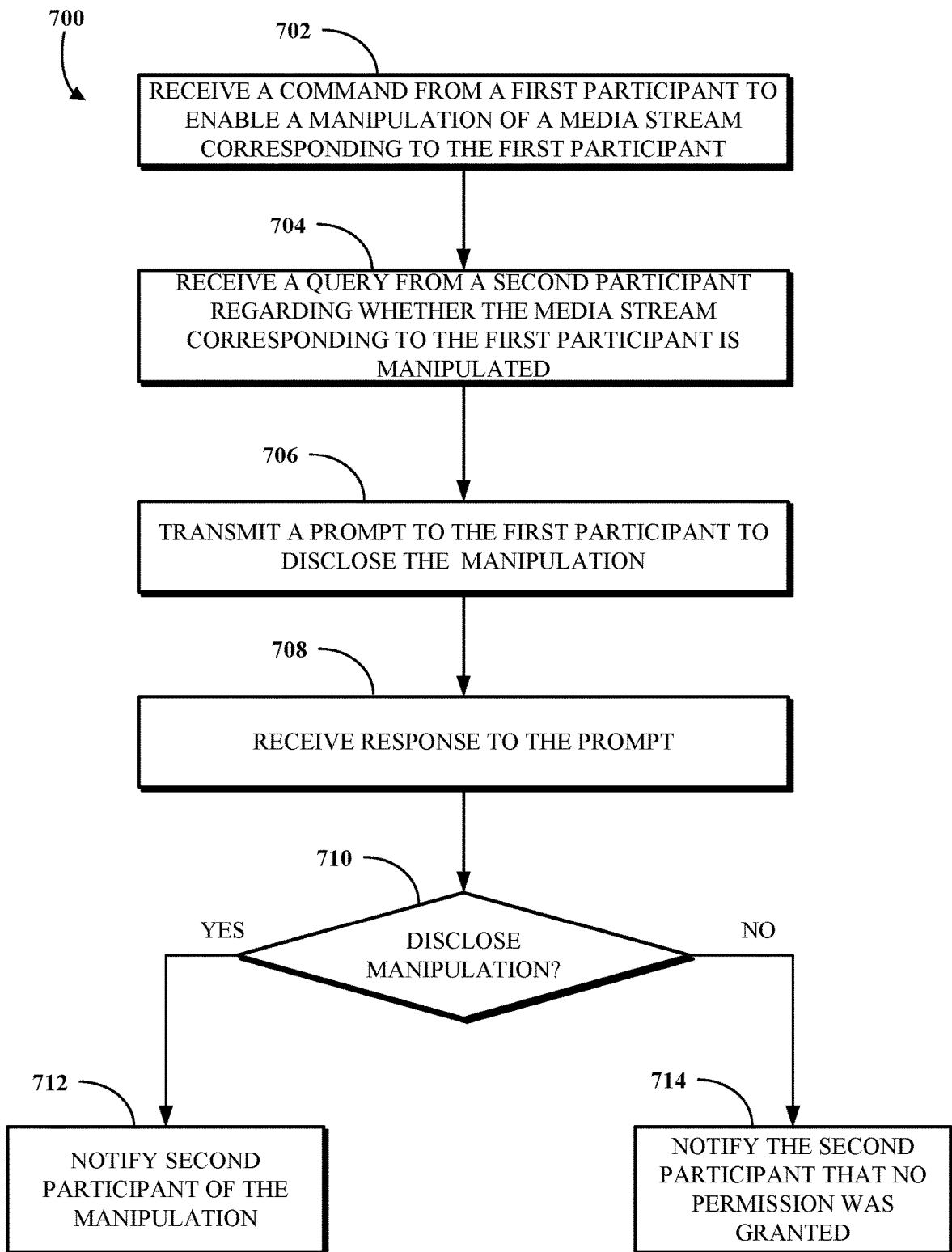
FIG. 7 is a flowchart of an example of a technique for notifying a communication session participant of a manipulation.

FIG. 7 is a flowchart of an example of a technique 700 for notifying a communication session participant of a manipulation. The technique 700 can be executed using computing devices, such as the systems, hardware, and software described with respect to FIGS. 1-6. The technique 700 can be performed, for example, by executing a machine-readable program or other computer-executable instructions, such as routines, instructions, programs, or other code. The steps, or operations, of the technique 700 or another technique, method, process, or algorithm described in connection with the implementations disclosed herein can be implemented directly in hardware, firmware, software executed by hardware, circuitry, or a combination thereof. For simplicity of explanation, the description herein includes statements such as "a command/query/prompt is received from a conference participant." Such statements should be understood to mean that "a command/query/prompt is received from a device associated with the conference participant." Furthermore, "a manipulation of a conference participant" should be understood to mean "a manipulation of a media stream associated with or corresponding to a conference participant."

At 702, a command is received from a first communication session participant (i.e., a first participant) to enable a manipulation of a media stream corresponding to the first participant. To illustrate, the first participant may configure a virtual background such that an actual background that is captured by a camera of the first participant is replaced by another image or image stream. In another example, the first participant may have applied a filter (e.g., an overlay) that alters the likeness (e.g., face or attire) of the first participant. In yet another example, the first participant may replace their voice with a singing voice. For example, a manipulation tool that is under the control of the manipulation detection software 600 (or a containing software platform) may enable a user to select an audio reference sample (e.g., a recording of a song or jingle). The manipulation tool may receive the audio stream of the first participant and manipulate the audio signal such that it is output according to the melody, rhythm, or harmony of the audio reference sample. The other participants of the communication session receive the manipulated media stream.

In yet another example, a manipulation tool may perform accent reduction. An accent reduction manipulation tool may alter the speech of the first participant to remove (or reduce) an accent of the first participant. The accent reduction manipulation tool may be a machine learning model that is trained to reduce or eliminate accents in a speech. In an example, the accent reduction manipulation tool may include or implement speech models for several pairs of languages. As such, a participant may select a source language (e.g., the native language of the speaker) and a target language and the accent reduction manipulation tool converts their speech from the source language accent to that of a native speaker in the second language. For example, the first participant may be a German native speaker but is speaking in English (with an accent) in the communication session. As such, the accent reduction manipulation tool can output the speech without the German accent while retaining the voice signature of the participant.

At 704, a query is received from a second participant regarding whether the media stream corresponding to the first participant is manipulated. The second participant may request this query even when the manipulation is undetectable. For example, the second participant may suspect that a manipulation is performed and may transmit a query to the manipulation detection software 600 to inquire whether the media stream of the first participant is manipulated. The query essentially states "is this media stream manipulated?"

To illustrate, the communication session may be a video conference. A user interface component (e.g., a button) associated with a tile of the first participant may enable the second participant to transmit the query to the manipulation detection software 600. As another illustration, the communication session may be a telephone call. The second participant may transmit the query by pressing a key combination on their telephone keypad. For example, the key combination "##09" (or some other key combination) captured in a dual tone multi-frequency (DTMF) or like signal may be interpreted by the manipulation detection software 600 as being the query.

At 706, a prompt is transmitted to the device of the first participant prompting the first participant to provide a permission to the manipulation detection software 600 to reply to the query with whether the media stream is manipulated. That is, the first participant is prompted whether the manipulation should be disclosed to the second participant. At 708, a response to the prompt is received from the first participant. The response can be one of grant or a denial of a permission to disclose the manipulation. In an example, if a response is not explicitly received from the first participant within a predefined period of time, then a denial response can be assumed.

At 710, if the response indicates a grant of the permission to disclose the manipulation, the technique 700 proceeds to 712 to notify the second participant that the second participant is receiving a manipulated media stream; otherwise, the technique 700 proceeds to 714 to notify the second participant that the manipulation detection software 600 is not permitted to disclose whether the media stream of the first participant is manipulated. Alternatively, at 714, the technique 700 may notify the second participant that it cannot be determined with certainty whether the media stream of the first participant is manipulated.

In an example, rather than merely indicating whether or not the second participant is receiving a manipulated media stream, the technique 700 may provide data describing the manipulations enabled by the first participant. The data describing the manipulations can include the manipulations enabled and configurations selected by the first participant for the manipulations. To illustrate, the data describing the manipulations may essentially indicate that the first participant has enabled a virtual background, that the first participant has enabled a filter that displays a Superman avatar (instead of the likeness of the first participant), and/or that an accent reduction manipulation tool that is configured for German-accent removal is enabled.

Figure 8:
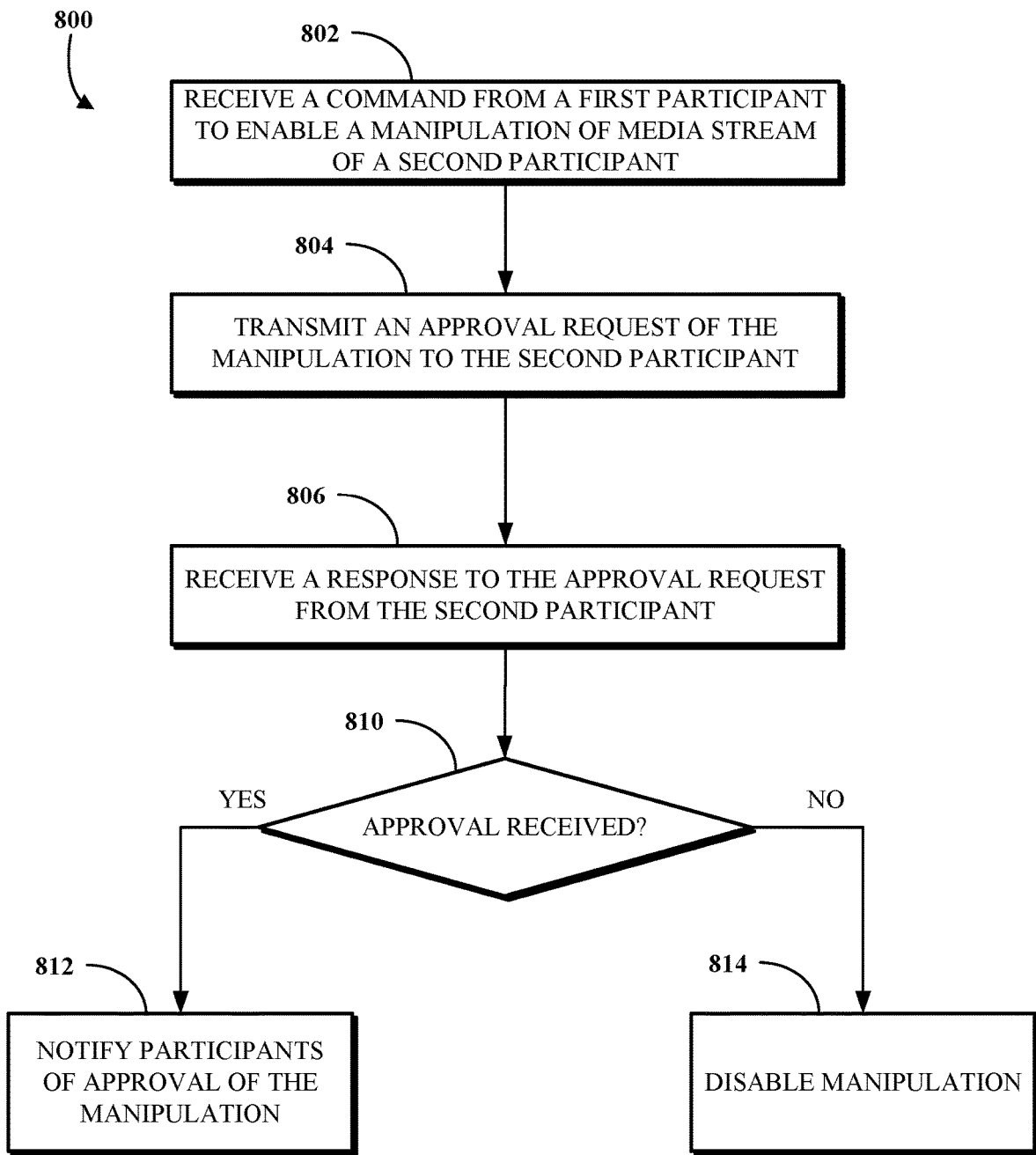
FIG. 8 is a flowchart of an example of a technique for notifying a communication session participant of a manipulation.

FIG. 8 is a flowchart of an example of a technique 800 for notifying a communication session participant of a manipulation. The technique 800 can be executed using computing devices, such as the systems, hardware, and software described with respect to FIGS. 1-6. The technique 800 can be performed, for example, by executing a machine-readable program or other computer-executable instructions, such as routines, instructions, programs, or other code. The steps, or operations, of the technique 800 or another technique, method, process, or algorithm described in connection with the implementations disclosed herein can be implemented directly in hardware, firmware, software executed by hardware, circuitry, or a combination thereof.

At 802, a command is received from a first participant (i.e., from a receiving device of the first participant) to enable a manipulation of second participant (i.e., of a media stream associated with the second participant) of a communication session. At 804, an approval request of the manipulation is transmitted to the second participant (i.e., to a sending device of the second participant). In an example, the approval request may be transmitted in response to a query received from the second participant regarding whether the media stream of the second participant is being manipulated. In an example, the approval request may include data describing the manipulations enabled by one or more other participants, including the first participant, to the media stream of the second participant.

At 806, a response to the approval request is received from the second participant. The response can be or include an approval of the manipulation or a denial of the manipulation. At 810, if the response includes an approval of the manipulation, the technique 800 proceeds to 812; otherwise the technique 800 proceeds to 814.

At 812, notifications of the approval are transmitted to those participants receiving the manipulated media stream of the second participant. In an example, and where the media stream is associated with a tile, as described above, an indication of the approval (e.g., a checkmark) may be overlaid on the tile. In an example, and where the media stream is an audio stream of telephone call, the manipulation-enabling tool 602 of FIG. 6 may interject a verbal message into the telephone call indicating approval of the manipulation by the second participant. At 814, the manipulation is disabled. That is, the manipulation is no longer applied to the media stream received from the second participant. In another example, instead of disabling the manipulation, a notification of the disapproval may be transmitted to the participants receiving the manipulated media stream. The notification of the disapproval essentially states "the second participant does not approve of the manipulation."

In an example, the approval request transmitted at 804 may include data describing the manipulations enabled by one or more other participants, including the first participant, to the media stream of the second participant. In an example, the response to the approval request received at 806 may include respective approvals or denials of each of the enabled manipulations.

Figure 9:
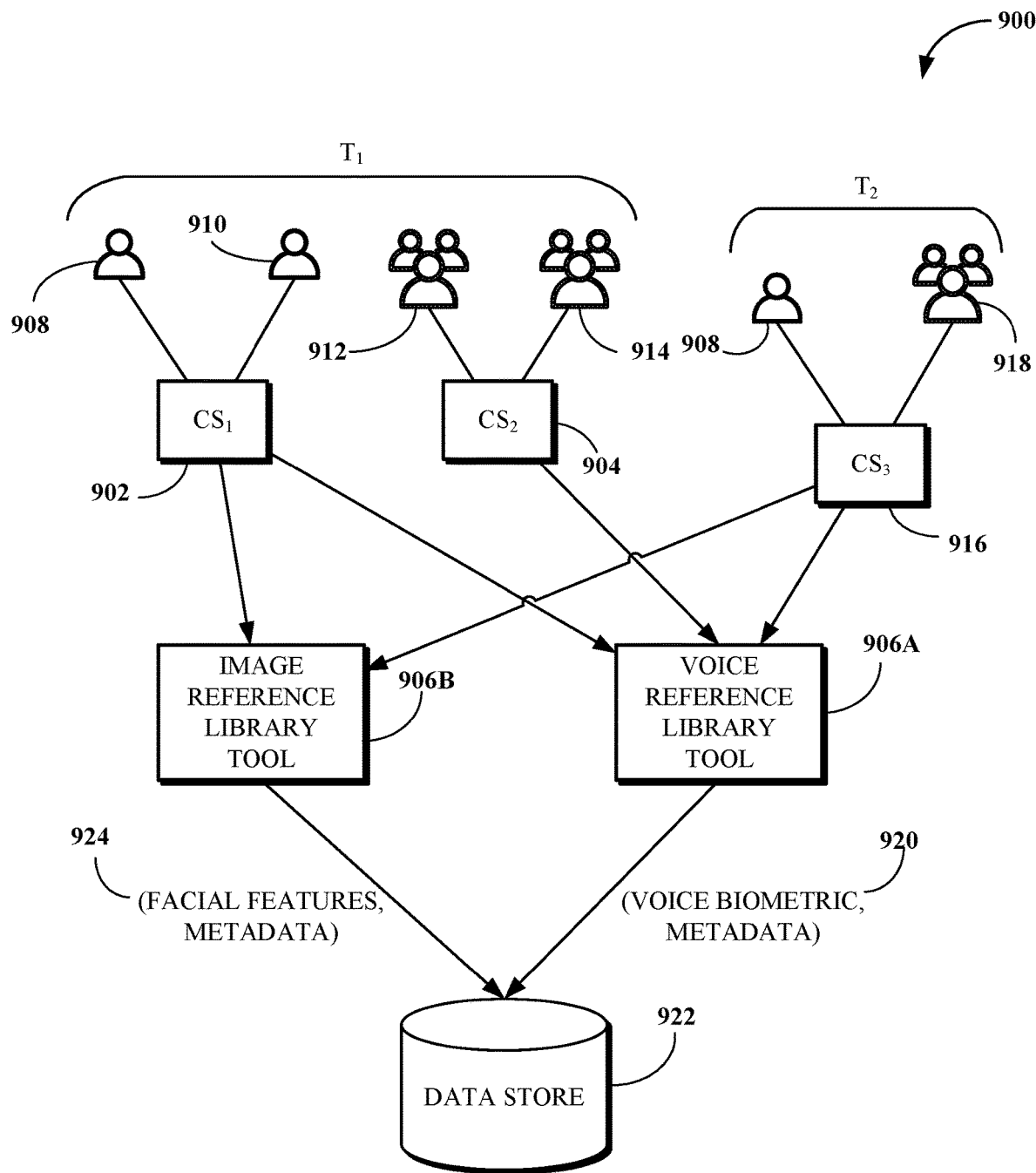
FIG. 9 illustrates an example of constructing reference libraries.

FIG. 9 illustrates an example 900 of constructing reference libraries. The example 900 illustrates that at a time $T_1$, a communication session 902 ($CS_1$) and a communication session 904 ($CS_1$) are hosted by (e.g., taking place using, facilitated by, or enabled by) a software platform (not shown) that includes a voice reference library tool 906A, which can be the voice reference library tool 606 of FIG. 6, and a visual reference library tool 906B, which can be the visual reference library tool 608 of FIG. 6.

The communication session 902 includes participants 908 and 910. The communication session 904 includes groups of participants 912 and 914. The example 900 also illustrates that at a time $T_2$, which may be later than $T_1$, a communication session 916 includes the participant 908 and a group of participants 918.

FIG. 9 further illustrates that audio media streams from the communication sessions 902, 904, and 916 are received and processed by the voice reference library tool 906A as respective audio channels are enabled for each of these communication sessions. On the other hand, as no video channel is enabled for the communication session 904, video media streams only from the communication sessions 902 and 916 are received and processed by the visual reference library tool 906B.

The voice reference library tool 906A may include, use, or work in conjunction with a machine learning model (not shown) that is trained to extract uniquely identifying biological (voice) characteristics from voice samples (i.e., voice biometrics). It is noted that the voice samples from speakers during communication sessions are transiently used (i.e., are not permanently saved) to only extract the voice biometrics. As indicated above, the voice biometrics are used for metadata matching and are not used for identification of specific participants.

The voice reference library tool 906A associates metadata identified for a participant with voice biometrics obtained for the participant, such as the voice biometric metadata association 920, in a data store 922, which may include the voice biometrics reference library. To be more exact, the association is between a voice biometric and the metadata. As such, the data store may include respective associations for at least some of the participants of the communication session.

The metadata can include any identifiable information related to the details of the connection from a device of a participant device to the software platform. Such identifiable information may include a telephone number, an IP address, a type (e.g., a manufacturer) of the device, an operating system of the device, a location of the device, an email address used to initiate the communication session, and/or a time zone at the device.

In an example, the identifiable information may include a name of the participant. In an example, if the participant is registered, the name may be obtained from a profile of the participant. In an example, the participant may identify themselves to the software platform upon joining a communication session. The participant may enter a name. In another example, the participant may identify themselves, such as by declaring "this is Bob."

To illustrate, in a first example, the participant 908, and without enabling any voice manipulation tools, may have called into the communication session 902 from a telephone number 555-111-2222 and into the communication session 916 from a telephone number 666-111-2222. As such, one voice biometric obtained for the participant 908 may be associated with the metadata 555-111-2222 and 666-111-2222 in the data store 922. In a second example, the participant 908 uses the telephone number 555-111-2222 and a first voice (enabled by a manipulation tool) to join the communication session 902 and the telephone number 555-111-2222 and a second voice that is different from the first voice to call into the communication session 916. As such, two different voice biometrics can be associated with the telephone number 555-111-2222 in the data store 922.

In an example, the voice reference library tool 906A maintains a name equivalents mapping. To illustrate, "Robert," "Rob, and "Bob" are name equivalents. In response to identifying a name equivalent, the voice reference library tool 906A does not create a new association for an already existing voice biometric. To illustrate, if an association already exists between a voice biometric and the name "Robert," a new association is not created between the voice biometric and the name "Rob." Rather, the metadata of the existing association between the voice biometric and the metadata that include "Robert" are updated to also include the name "Rob."

In an example, the voice reference library tool 906A does not obtain voice biometrics from participants identified as being in a group. For example, no voice biometrics (and therefore no associations) may be obtained for the participants of (i.e., for the voices identified in) the groups of participants 912, 914, and 918. This is so because the metadata would not be sufficiently identifying of the participants of the groups.

The visual reference library tool 906B may include, use, or work in conjunction with a machine learning model (not shown) that is trained to extract facial biometrics from video streams of communication session participants. It is noted that image samples, extracted from video streams of participants during communication sessions, are transiently used (i.e., are not permanently saved) to only extract the facial biometrics. The facial biometrics are used for metadata matching and are not used for identification of specific participants.

The visual reference library tool 906B associates metadata identified for a participant with facial biometrics obtained for the participant, such as the facial features metadata association 924, in a data store 922, which may include the facial biometrics reference library. To be more exact, the association is between facial biometrics and the metadata. As such, the data store may include respective associations for at least some of participants of the communication session. The metadata can be as described with the respect to the voice reference library tool 906A.

Figure 10:
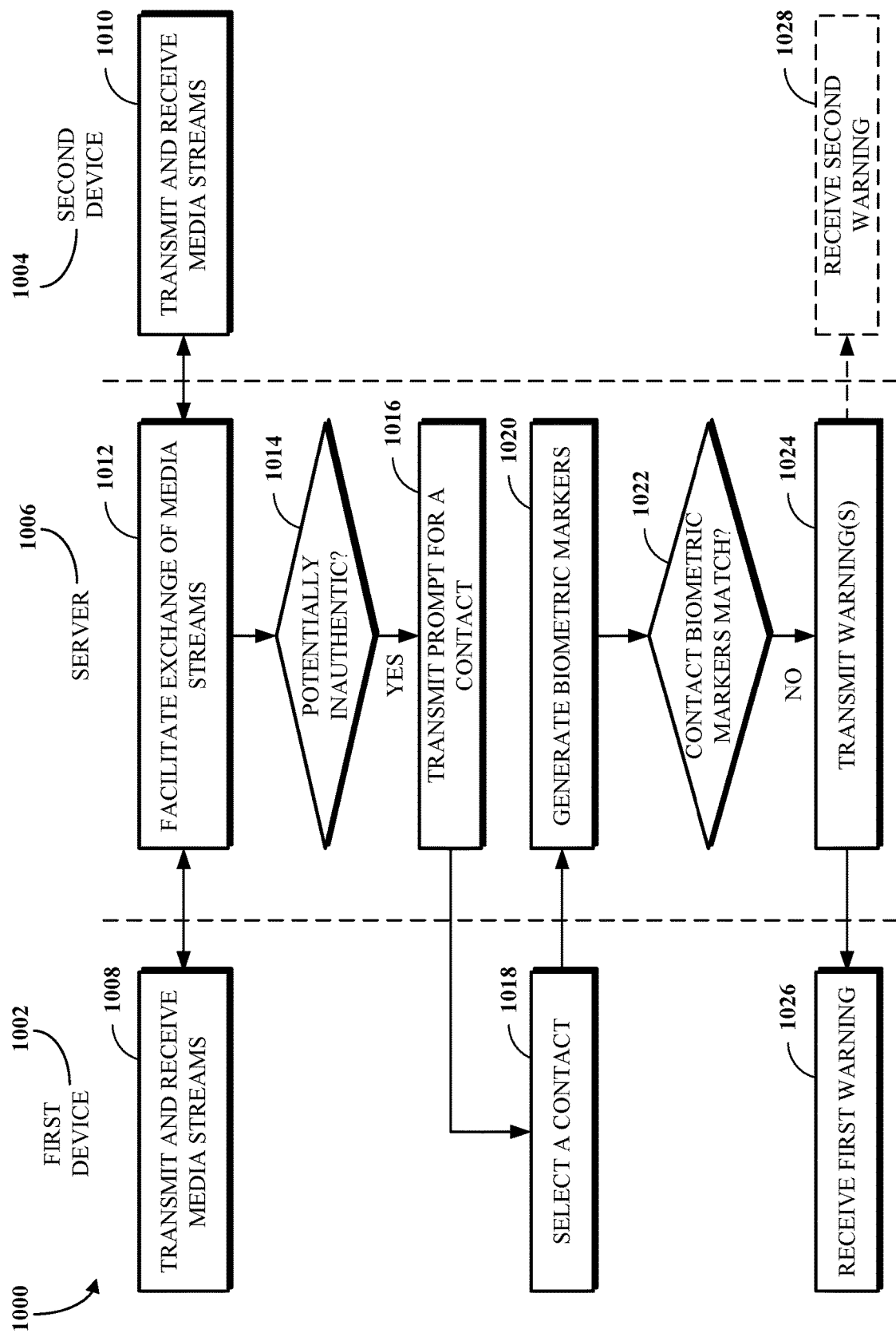
FIG. 10 is an example of an interaction diagram for using biometric markers to validate a communication session participant.

FIG. 10 is an example of an interaction diagram 1000 for using biometric markers to validate a communication session participant. The interaction diagram 1000 illustrates that a first device 1002 of a first participant and a second device 1004 of a second participant are joined to a communication session (not shown) that is hosted by a server 1006. More devices of more participants may be joined to the communication session. The first participant may be a callee and the second participant may be a caller.

The first device 1002 may transmit a first media stream to the server 1006, which then transmits the first media stream to the second device 1004; and the second device 1004 may transmit a second media stream to the server 1006, which then transmits the second media stream to the first device 1002. As such, at 1008, the first device 1002 transmits and receives media streams; at 1010, the second device 1004 transmits and receives media streams; and, at 1012, the server 1006 facilitates the receipt and transmission of the media streams.

At 1014, the server 1006 determines whether the second participant is potentially inauthentic. For example, the server 1006 may obtain an authenticity level associated with the second participant, as described with respect to the inauthenticity warning tool 604. If the authenticity level is below a threshold authenticity level, then the second participant may be considered to be potentially inauthentic.

If the server 1006 determines that the second participant is not potentially inauthentic, then the interaction diagram 1000 terminates (not shown). If the server 1006 determines that the second participant is potentially inauthentic, then, at 1016, the server 1006 prompts the first participant to select a contact from a contact list of the first participant. To illustrate, the server 1006 (via a contact identification tool) may display or cause to be displayed at the first device 1002 a list of contacts with a message essentially stating, "Who do you think you're communicating with?" In an example, images associated with contacts of the contact list may be displayed to the first participant. At 1018, the first participant selects a contact and an indication of the selected participant is transmitted to the server 1006.

At 1020, the server 1006 generates biometric markers (i.e., at least one of a voice biometric or facial biometrics) using the media stream from the second participant. At 1022, the server 1006 compares the biometric markers to the biometric markers associated with the contact (i.e., contact biometric markers), which are described with respect to the contact identification tool 614 of FIG. 6. The server 1006 can determine that there is no match if the comparison does not at least meet a match threshold.

If the contact biometric markers match the obtained biometric markers, then the interaction diagram 1000 terminates (not shown). On the other hand, if the contact biometric markers do not match the obtained biometric markers, then, at 1024, the server 1006 transmits a first warning to the first participant indicating that the second participant may not be authentic. The warning may include recommendations that the first participant may implement to verify the authenticity of the second participant. At 1026, the first warning is presented (e.g., displayed or output) at the first device 1002. At 1024, the server 1006 may optionally transmit a second warning to the second participant indicating that the second participant is determined not to be authentic. At 1028, the second warning, if received from the server 1006, may be presented (e.g., displayed or output) at the second device 1004. It is noted that the use of "first" and "second" does not imply a sequence or ordering; but rather is simply to associate such modifiers with the first device 1002 and the second device 1004, respectively.

Figure 11:
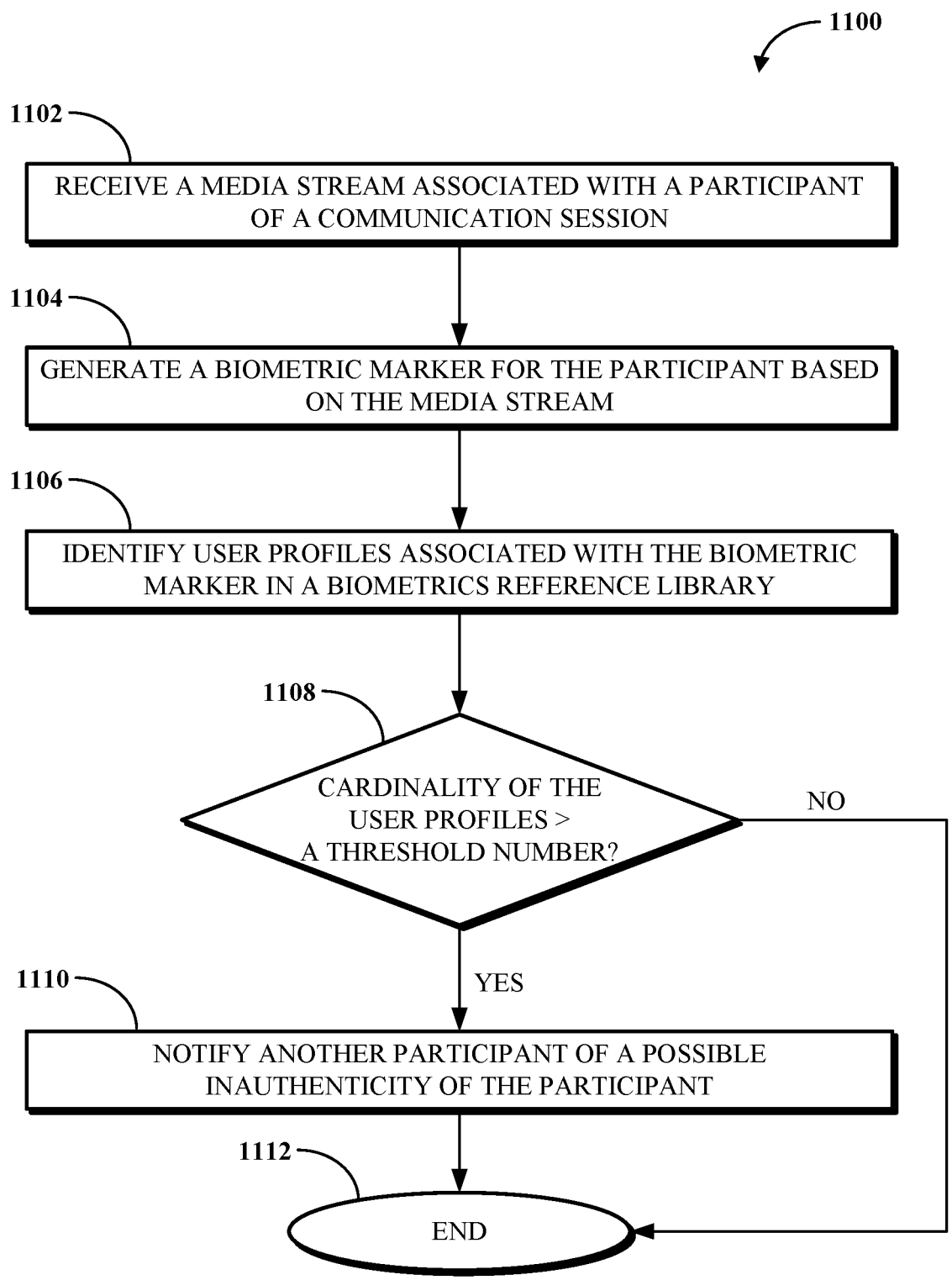
FIG. 11 is a flowchart of an example of a technique for identifying a communication session participant as potentially inauthentic if the participant is associated with multiple profiles.

To further describe some implementations in greater detail, reference is next made to examples of techniques which may be performed by or for a multi-profile-based inauthenticity identification. FIG. 11 is a flowchart of an example of a technique 1100 for identifying a communication session participant as potentially inauthentic if the participant is associated with multiple profiles. The technique 1100 can be executed using computing devices, such as the systems, hardware, and software described with respect to FIGS. 1-10. The technique 1100 can be performed, for example, by executing a machine-readable program or other computer-executable instructions, such as routines, instructions, programs, or other code. The steps, or operations, of the technique 1100 or another technique, method, process, or algorithm described in connection with the implementations disclosed herein can be implemented directly in hardware, firmware, software executed by hardware, circuitry, or a combination thereof.

At 1102, a media stream associated with a participant of a communication session is received. The media stream may be an audio stream or an audio and video stream. The media stream may be received from a device of or associated with the participant. The device is connected to the communication session. At 1104, a biometric marker is generated for the participant based on the media stream. The biometric marker can be at least one of a facial biometric marker or a voice biometric marker. At 1106, user profiles associated with the biometric marker are identified in a biometrics reference library. The biometrics reference library can be one or both of a voice biometrics reference library or a facial biometrics reference library, which may be stored in a data store, such as the data store 506 of FIG. 5 or the data store 922 of FIG. 9.

At 1108, it is determined whether a cardinality (e.g., a number) of the user profiles exceeds a threshold number. In an example, the threshold number may be two as it may not be atypical for a person to, at different times, make use of a personal device and/or a work device to participate in communication session or be known by one name professionally (e.g., "Robert") vs. personally ("Bobby"). If the cardinality of the user profiles exceeds the threshold number, the technique 1100 proceeds to 1110; otherwise, the technique 1100 ends at 1112. At 1110, at least one other participant can be notified of a possible inauthenticity of the participant.

As described above, determining whether the cardinality of the user profiles exceeds the threshold number can include at least one of determining whether the user profiles comprise different names for the participant, determining whether the user profiles comprise different telephone numbers, and/or determining whether the user profiles comprise different locations.

In an example, the media stream of the participant may be blocked if the cardinality of the user profiles exceeds the threshold number. That the media stream of the participant is blocked can include that the device of the participant is disconnected from the communication session. In another example, the technique 1100 stops transmitting media streams of other participants to the participant if the cardinality of the user profiles exceeds the threshold number.

In an example, the technique 1100 can further include identifying metadata associated with the participant and associating the biometric marker with the metadata in the biometrics reference library. That is, the profile of the participant may be updated to include the identified metadata.

Figure 12:
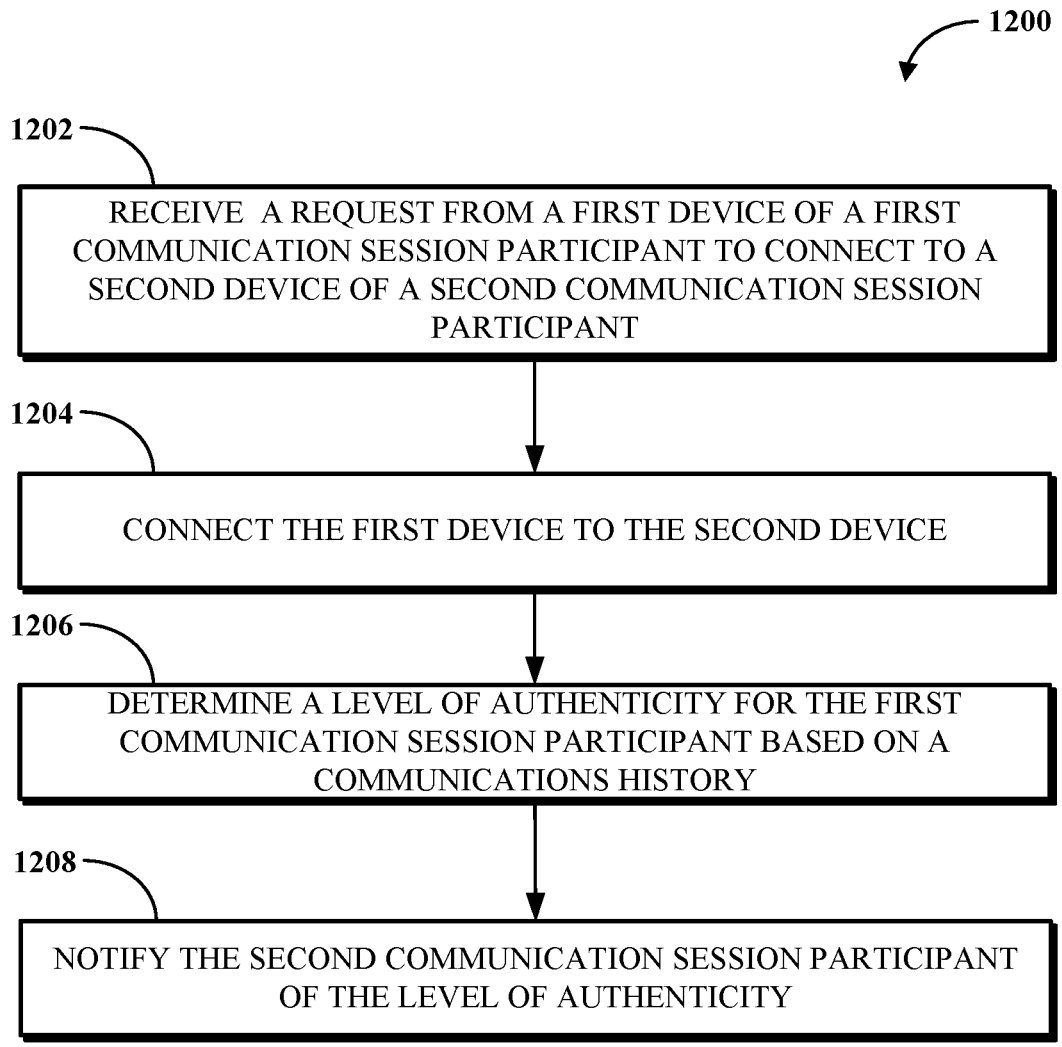
FIG. 12 is a flowchart of an example of a technique for notifying a participant of a determined level of authenticity of another participant of a communication session.

FIG. 12 is a flowchart of an example of a technique 1200 for notifying a participant of a determined level of authenticity of another participant of a communication session. The technique 1200 can be executed using computing devices, such as the systems, hardware, and software described with respect to FIGS. 1-10. The technique 1200 can be performed, for example, by executing a machine-readable program or other computer-executable instructions, such as routines, instructions, programs, or other code. The steps, or operations, of the technique 1200 or another technique, method, process, or algorithm described in connection with the implementations disclosed herein can be implemented directly in hardware, firmware, software executed by hardware, circuitry, or a combination thereof.

At 1202, a request from a first device of a first communication session participant to connect to a second device of a second communication session participant is received. The request can be received at communications software, which can be the software platform 408 of FIG. 4 or the software platform 504 of FIG. 5. At 1204, the communications software connects the first device to the second device. At 1206, a level of authenticity is determined for the first communication session participant based on a communications history of at least one of the first communication session participant or the second communication session participant. At 1208, the second communication session participant is notified of the level of authenticity.

In an example, the level of authenticity for the first communication session participant can be determined in response to identifying communications with more than a threshold number of participants in the communication history of the first communication session participant. For example, the communication history of the first communication session participant can be examined (e.g., queried) to determine whether the first communication session participant has had communications with more than the threshold number of participants and, if so, the first communication session participant can be deemed potentially inauthentic. More generally, the level of authenticity can have an inverse proportional relationship to the number of callees. In an example, the level of authenticity for the first communication session participant can be determined based on whether the communication history of the second communication session participant includes communications from the first communication session participant and/or based on a number of such communications. In an example, the level of authenticity is determined based on triggering keywords identified by the communication software in a media stream associated with first communication session participant.

In an example, the first communication session participant is a registered participant of the communications software, the second communication session participant is an unregistered participant of the communications software, and the level of authenticity of the second communication session participant can be determined based on a calling history of the first communication session participant. In an example, the first communication session participant is an unregistered participant of the communications software, the second communication session participant is a registered participant of the communications software, and the level of authenticity of the first communication participant can be determined based on a calling history of the second communication session participant.

In an example, the level of authenticity for the first communication session participant is determined in response to a request from the second communication session participant. In an example, the level of authenticity for the first communication session participant is determined based on a recency of a registration of the first communication session participant with the communications software.

Figure 13:
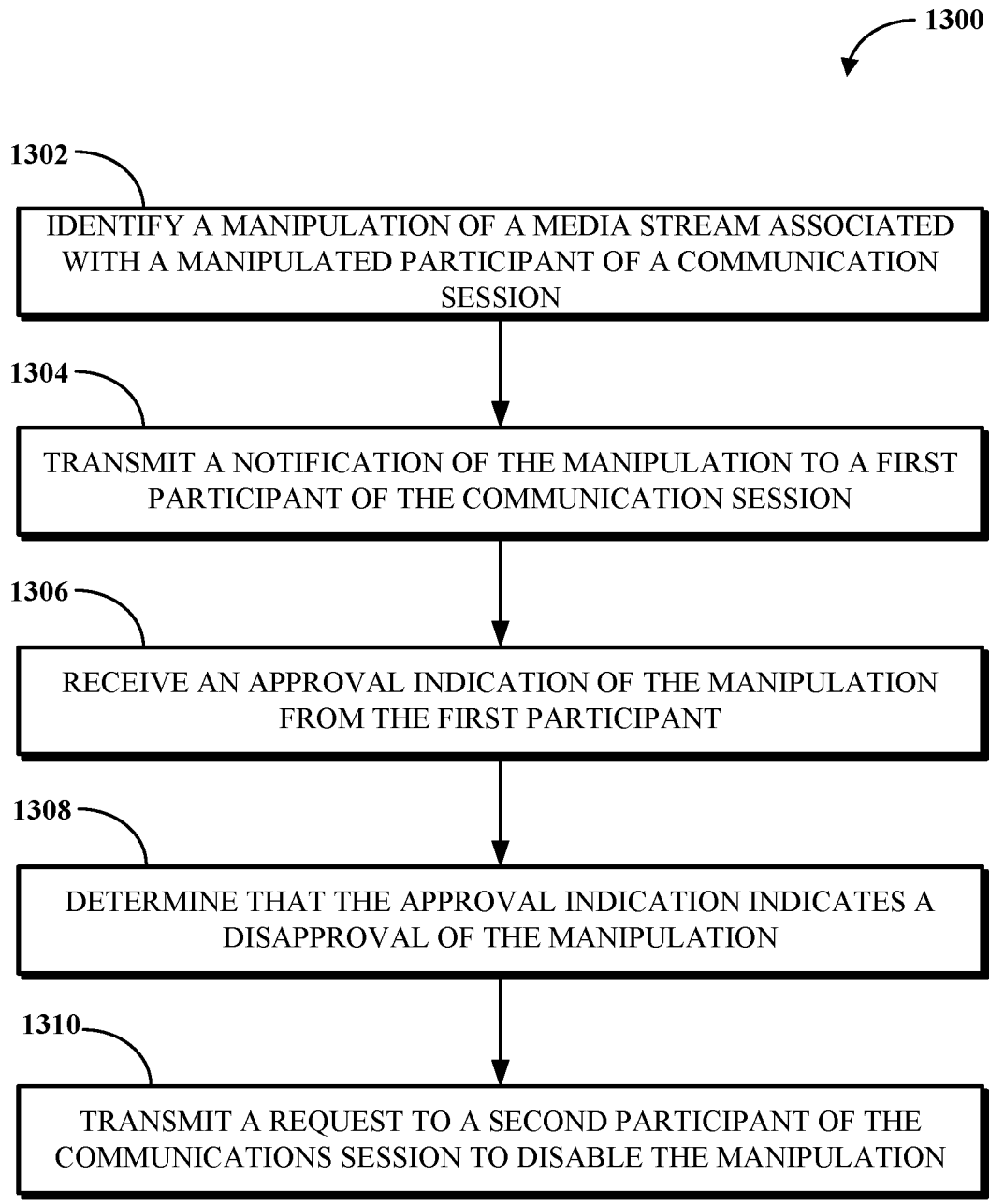
FIG. 13 is a flowchart of an example of a technique for seeking approval for a manipulation.

FIG. 13 is a flowchart of an example of a technique 1300 for seeking approval for a manipulation. The technique 1300 can be executed using computing devices, such as the systems, hardware, and software described with respect to FIGS. 1-10. The technique 1300 can be performed, for example, by executing a machine-readable program or other computer-executable instructions, such as routines, instructions, programs, or other code. The steps, or operations, of the technique 1300 or another technique, method, process, or algorithm described in connection with the implementations disclosed herein can be implemented directly in hardware, firmware, software executed by hardware, circuitry, or a combination thereof.

At 1302, a manipulation of a media stream associated with a manipulated participant of a communication session is identified. In an example, the manipulation may be performed by a manipulation tool under the control of a software platform. In another example, the manipulation may be performed by a manipulation tool that is not under the control of a software platform. The manipulation may be identified (e.g., detected) at least as described herein.

At 1304, a notification of the manipulation is transmitted to a first participant of the communication session. In an example, the notification of the manipulation can include a degree of the manipulation. At 1306, an approval indication of the manipulation is received from the first participant. At 1308, it is determined that the approval indication indicates a disapproval of the manipulation. At 1310, a request to disable the manipulation is transmitted to a second participant of the communication session. In an example, if the manipulation is not disabled in response to the request to disable the manipulation, the second participant can be disconnected from the communication session.

In an example, the manipulation is enabled by the manipulated participant, the first participant is a participant other than the manipulated participant, and the second participant is the manipulated participant. In another example, the manipulation is enabled by the second participant, the first participant is different from the manipulated participant, and the second participant is the manipulated participant.

In an example, identifying the manipulation of the media stream associated with the manipulated participant can include obtaining initial images (e.g., initial media) from a camera of a device of the manipulated participant. An initial biometric marker can be obtained based on the initial images. Current images (e.g., current media) can be obtained from the media stream. A current biometric marker can be obtained from the current images. A match score can be obtained by comparing the initial biometric marker to the current biometric marker.

In an example, transmitting the notification of the manipulation to the first participant of the communication session can include obtaining initial voice samples (e.g., initial media) from a microphone of a device of the manipulated participant. An initial biometric marker can be obtained based on the initial voice samples. Current voice samples (e.g., current media) can be obtained from the media stream. A current biometric marker can be obtained from the current images. A match score can be obtained by comparing the initial biometric marker to the current biometric marker.

For simplicity of explanation, the techniques 700, 800, 1100, 1200, and 1300 are depicted and described herein as respective series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method. The method includes identifying a manipulation of a media stream associated with a manipulated participant of a communication session. The method also includes transmitting a notification of the manipulation to a first participant of the communication session. The method also includes receiving an approval indication of the manipulation from the first participant. The method also includes determining that the approval indication indicates a disapproval of the manipulation. The method also includes transmitting a request to disable the manipulation to a second participant of the communication session. Other embodiments of this aspect include corresponding computer systems, apparatus, and computer programs recorded on one or more computer storage devices, each configured to perform the actions of the methods.

Implementations may include one or more of the following features. The method where the manipulation can be enabled by the manipulated participant, and the second participant can be the manipulated participant. The manipulation can be enabled by the first participant, and the second participant can be the manipulated participant. The method may include, in response to the manipulation not being disabled, disconnecting the second participant from the communication session. The notification of the manipulation may include a degree of the manipulation.

Identifying the manipulation of the media stream associated with the manipulated participant of the communication session may include obtaining initial images from a camera of a device of the manipulated participant; obtaining an initial biometric marker based on the initial images; obtaining current images from the media stream; obtaining a current biometric marker from the current images; and obtaining a match score by comparing the initial biometric marker to the current biometric marker.

Transmitting the notification of the manipulation to the first participant of the communication session may include obtaining initial voice samples from a microphone of a device of the manipulated participant; obtaining an initial biometric marker based on the initial voice samples; obtaining current voice samples from the media stream; obtaining a current biometric marker from the current voice samples; and obtaining a match score by comparing the initial biometric marker to the current biometric marker.

Implementations of the described techniques may include hardware, a method or process, or computer software on a computer-accessible medium.

One general aspect includes a device. The device includes a memory and a processor. The processor is configured to execute instructions stored in the memory to identify a manipulation of a media stream associated with a manipulated participant of a communication session, transmit a notification of the manipulation to a first participant of the communication session, receive an approval indication of the manipulation from the first participant, determine that the approval indication indicates a disapproval of the manipulation, and transmit a request to disable the manipulation to a second participant of the communication session. Other embodiments of this aspect include corresponding computer systems, apparatus, and computer programs recorded on one or more computer storage devices, each configured to perform the actions of the methods.

Implementations may include one or more of the following features. The device where the manipulation can be enabled by the manipulated participant, the first participant can be a participant other than the manipulated participant, and the second participant can be the manipulated participant. The manipulation can be enabled by the first participant, the first participant can be different from the manipulated participant, and the second participant can be the manipulated participant.

The processor can be further configured to execute instructions stored in the memory to, in response to the manipulation not being disabled, disconnect the second participant from the communication session. The notification of the manipulation may include a degree of the manipulation. The instructions to identify the manipulation of the media stream associated with the manipulated participant of the communication session may include instructions to obtain initial images from a camera of a device of the manipulated participant; obtain an initial biometric marker based on the initial images; obtain current images from the media stream; obtain a current biometric marker from the current images; and obtain a match score by comparing the initial biometric marker to the current biometric marker. The instructions to transmit the notification of the manipulation to the first participant of the communication session may include instructions to obtain initial voice samples from a microphone of a device of the manipulated participant; obtain an initial biometric marker based on the initial voice samples; obtain current voice samples from the media stream; obtain a current biometric marker from the current voice samples; and obtain a match score by comparing the initial biometric marker to the current biometric marker.

Implementations of the described techniques may include hardware, a method or process, or computer software on a computer-accessible medium.

One general aspect includes a non-transitory computer-readable storage medium storing instructions operable to cause one or more processors to perform operations that include identifying a manipulation of a media stream associated with a manipulated participant of a communication session, transmitting a notification of the manipulation to a first participant of the communication session, receiving an approval indication of the manipulation from the first participant, determining that the approval indication indicates a disapproval of the manipulation, and transmitting a request to disable the manipulation to a second participant of the communication session. Other embodiments of this aspect include corresponding computer systems, apparatus, and computer programs recorded on one or more computer storage devices, each configured to perform the actions of the methods.

Implementations may include one or more of the following features. The non-transitory computer-readable storage medium where the manipulation can be enabled by the manipulated participant, the first participant can be a participant other than the manipulated participant, and the second participant can be the manipulated participant. The manipulation can be enabled by the first participant, the first participant can be different from the manipulated participant, and the second participant can be the manipulated participant.

The operations may further include, in response to the manipulation not being disabled, disconnecting the second participant from the communication session. The notification of the manipulation may include a degree of the manipulation. Transmitting the notification of the manipulation to the first participant of the communication session may include obtaining initial media from a device of the manipulated participant, where the initial media may include at least one of initial images or initial voice samples; obtaining an initial biometric marker based on the initial media; obtaining current media from the media stream; obtaining a current biometric marker from the current media; and obtaining a match score by comparing the initial biometric marker to the current biometric marker.

Implementations of the described techniques may include hardware, a method or process, or computer software on a computer-accessible medium.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method implemented by a conferencing server, comprising:
   receiving a query from a first participant of a communication session regarding whether a media stream corresponding to a manipulated participant of the communication session is manipulated;
   transmitting an approval request to the manipulated participant seeking permission from the manipulated participant to reply to the query with whether the media stream is manipulated;
   receiving, in response to the approval request, a permission to reply to the query;
   identifying a manipulation of the media stream, wherein the manipulation comprises at least one of an accent reduction manipulation or a language translation manipulation;
   transmitting, in response to the query, a notification of the manipulation to the first participant;
   prompting the first participant to approve or disapprove the manipulation;
   receiving, based on the prompting, an approval indication of the manipulation from the first participant;
   determining that the approval indication indicates a disapproval of the manipulation; and
   transmitting a request to disable the manipulation to the manipulated participant of the communication session.

2. The method of claim 1, wherein the manipulation is enabled by the manipulated participant.

3. The method of claim 1, further comprising:
   in response to the manipulation not being disabled, disconnecting the manipulated participant from the communication session.

4. The method of claim 1, wherein the notification of the manipulation includes a degree of the manipulation.

5. The method of claim 1, wherein identifying the manipulation of the media stream associated with the manipulated participant of the communication session comprises:
   obtaining initial images from a camera of a device of the manipulated participant;
   obtaining an initial feature based on the initial images;
   obtaining current images from the media stream;
   obtaining a current feature from the current images; and
   obtaining a match score by comparing the initial feature to the current feature.

6. The method of claim 1, wherein transmitting the notification of the manipulation to the first participant of the communication session comprises:
   obtaining initial voice samples from a microphone of a device of the manipulated participant;
   obtaining an initial feature based on the initial voice samples;
   obtaining current voice samples from the media stream;
   obtaining a current feature from the current voice samples; and
   obtaining a match score by comparing the initial feature to the current feature.

7. A device, comprising:
   a memory; and
   a processor, the processor configured to execute instructions stored in the memory to:
     receive a query from a first participant of a communication session regarding whether a media stream corresponding to a manipulated participant of the communication session is manipulated;
     transmit an approval request to the manipulated participant seeking permission from the manipulated participant to reply to the query with whether the media stream is manipulated;
     receive, in response to the approval request, a permission to reply to the query;
     identify a manipulation of the media stream, wherein the manipulation comprises at least one of an accent reduction manipulation or a language translation manipulation;
     transmit, in response to the query, a notification of the manipulation to the first participant;

prompt the first participant to approve or disapprove the manipulation;

receive, based on the prompt, an approval indication of the manipulation from the first participant;

determine that the approval indication indicates a disapproval of the manipulation; and transmit a request to disable the manipulation to the manipulated participant of the communication session.

8. The device of claim 7, wherein the manipulation is enabled by the manipulated participant.

9. The device of claim 7, wherein the processor is further configured to execute instructions stored in the memory to:

in response to the manipulation not being disabled, disconnect the manipulated participant from the communication session.

10. The device of claim 7, wherein the notification of the manipulation comprises a degree of the manipulation.

11. The device of claim 7, wherein the instructions to identify the manipulation of the media stream associated with the manipulated participant of the communication session comprise instructions to:

obtain initial images from a camera of a device of the manipulated participant;

obtain an initial feature based on the initial images;

obtain current images from the media stream;

obtain a current feature from the current images; and obtain a match score by comparing the initial feature to the current feature.

12. The device of claim 7, wherein the instructions to transmit the notification of the manipulation to the first participant of the communication session comprise instructions to:

obtain initial voice samples from a microphone of a device of the manipulated participant;

obtain an initial feature based on the initial voice samples;

obtain current voice samples from the media stream;

obtain a current feature from the current voice samples; and obtain a match score by comparing the initial feature to the current feature.

13. A non-transitory computer-readable storage medium of a conferencing server storing instructions operable to cause one or more processors to perform operations, comprising:

receiving a query from a first participant of a communication session regarding whether a media stream corresponding to a manipulated participant of the communication session is manipulated;

transmitting an approval request to the manipulated participant seeking permission from the manipulated participant to reply to the query with whether the media stream is manipulated;

receiving, in response to the approval request, a permission to reply to the query;

identifying a manipulation of the media stream, wherein the manipulation comprises at least one of an accent reduction manipulation or a language translation manipulation;

transmitting, in response to the query, a notification of the manipulation to the first participant;

prompting the first participant to approve or disapprove the manipulation;

receiving, based on the prompting, an approval indication of the manipulation from the first participant;

determining that the approval indication indicates a disapproval of the manipulation; and transmitting a request to disable the manipulation to the manipulated participant of the communication session.

14. The non-transitory computer-readable storage medium of claim 13, wherein the manipulation is enabled by the manipulated participant, the first participant is a participant other than the manipulated participant.

15. The non-transitory computer-readable storage medium of claim 13, wherein the operations further comprise:

in response to the manipulation not being disabled, disconnecting the manipulated participant from the communication session.

16. The non-transitory computer-readable storage medium of claim 13, wherein the notification of the manipulation comprises a degree of the manipulation.

17. The non-transitory computer-readable storage medium of claim 13, wherein transmitting the notification of the manipulation to the first participant of the communication session comprises:

obtaining initial media from a device of the manipulated participant, wherein the initial media comprises at least one of initial images or initial voice samples;

obtaining an initial feature based on the initial media;

obtaining current media from the media stream;

obtaining a current feature from the current media; and obtaining a match score by comparing the initial feature to the current feature.

* * * * *